US012576836B2

(12) United States Patent
Garimella et al.

(10) Patent No.: US 12,576,836 B2
(45) Date of Patent: Mar. 17, 2026

(54) CONDITIONAL OBJECT POSITION PREDICTION BY A MACHINE LEARNED MODEL

(71) Applicant: Zoox, Inc., Foster City, CA (US)

(72) Inventors: Gowtham Garimella, Hayward, CA (US); Carl-Johan E Hoel, San Mateo, CA (US); Xianan Huang, Foster City, CA (US); Marin Kobilarov, Baltimore, MD (US); Gregory Michael Woelki, Foster City, CA (US); Albert Zhao, Saratoga, CA (US)

(73) Assignee: Zoox, Inc., Foster City, CA (US)

( * ) Notice: Subject to any disclaimer, the term of this patent is extended or adjusted under 35 U.S.C. 154(b) by 245 days.

(21) Appl. No.: 18/523,684

(22) Filed: Nov. 29, 2023

(65) Prior Publication Data

US 2025/0171016 A1 May 29, 2025

(51) Int. Cl.
| | |
|---|---|
| *B60W 30/09* | (2012.01) |
| *B60W 30/095* | (2012.01) |
| *B60W 50/00* | (2006.01) |
| *B60W 60/00* | (2020.01) |
| *G06F 18/23* | (2023.01) |

(52) U.S. Cl.
CPC ........ *B60W 30/09* (2013.01); *B60W 30/0956* (2013.01); *B60W 50/0097* (2013.01); *B60W 60/0015* (2020.02); *B60W 60/00274* (2020.02); *G06F 18/23* (2023.01); *B60W 2554/4041* (2020.02); *B60W 2554/4045* (2020.02); *B60W 2556/10* (2020.02); *B60W 2556/40* (2020.02)

(58) Field of Classification Search
CPC ............ B60W 30/09; B60W 30/0956; B60W 50/0097; B60W 60/0015; B60W 60/00274; B60W 2554/4041; B60W 2554/4045; B60W 2556/10; B60W 2556/40; G06F 18/23; G06V 10/764; G06V 10/82
See application file for complete search history.

(56) References Cited

U.S. PATENT DOCUMENTS

| | | | | |
|---|---|---|---|---|
| 9,886,856 B2 * | 2/2018 | Dougherty | ............. | G08G 1/162 |
| 10,565,880 B2 * | 2/2020 | Aoude | ................... | G08G 1/017 |

(Continued)

FOREIGN PATENT DOCUMENTS

| | | |
|---|---|---|
| CN | 112071059 B | 7/2021 |

OTHER PUBLICATIONS

Chen, Meng, Yang Liu, and Xiaohui Yu. "Predicting next locations with object clustering and trajectory clustering." Pacific-Asia Conference on Knowledge Discovery and Data Mining. Cham: Springer International Publishing, 2015. (Year: 2015).*

(Continued)

*Primary Examiner* — Russell Frejd
*Assistant Examiner* — Ana D Thomas
(74) *Attorney, Agent, or Firm* — Lee & Hayes, P.C.

(57) ABSTRACT

Techniques for predicting positions of objects in an environment are described herein. For example, the techniques may include clustering predicted object positions and using a representative target for one or more clusters to determine a predicted position of an autonomous vehicle. The clusters may vary in size, number of positions, etc. Object positions can be selected from one or more clusters for consideration during vehicle planning, which may include simulation.

20 Claims, 8 Drawing Sheets

(56) References Cited

U.S. PATENT DOCUMENTS

| | | | | |
|---|---|---|---|---|
| 11,151,880 | B1 | 10/2021 | Shou et al. | |
| 11,753,005 | B2 * | 9/2023 | Zhu | B60W 30/09 |
| | | | | 701/301 |
| 11,772,640 | B2 * | 10/2023 | Wang | G06F 18/2411 |
| | | | | 701/301 |
| 11,814,040 | B2 * | 11/2023 | Hardå | B60W 30/09 |
| 2013/0238240 | A1 * | 9/2013 | Tamai | G01C 21/34 |
| | | | | 701/527 |
| 2018/0345958 | A1 | 12/2018 | Lo et al. | |
| 2019/0047555 | A1 | 2/2019 | Düring et al. | |
| 2020/0023835 | A1 * | 1/2020 | Hardå | B60Q 9/008 |
| 2020/0272148 | A1 | 8/2020 | Karasev et al. | |
| 2021/0192748 | A1 | 6/2021 | Morales Morales et al. | |
| 2022/0274625 | A1 | 9/2022 | Garimella et al. | |
| 2023/0159059 | A1 | 5/2023 | Garimella et al. | |
| 2024/0059285 | A1 * | 2/2024 | Ng | B60W 50/14 |
| 2024/0059319 | A1 * | 2/2024 | Beaudoin | G06N 3/084 |

OTHER PUBLICATIONS

Chen, Meng, Yang Liu, and Xiaohui Yu. "Predicting next locations with object clustering and trajectory clustering." Pacific-Asia Conference on Knowledge Discovery and Data Mining. Cham: Springer International Publishing, 2015. (Year: 2015) (Year: 2015).*

Search Report and Written Opinion for International Application No. PCT/US2024/056747, Dated Mar. 7, 2025, 9 pages.

* cited by examiner

200

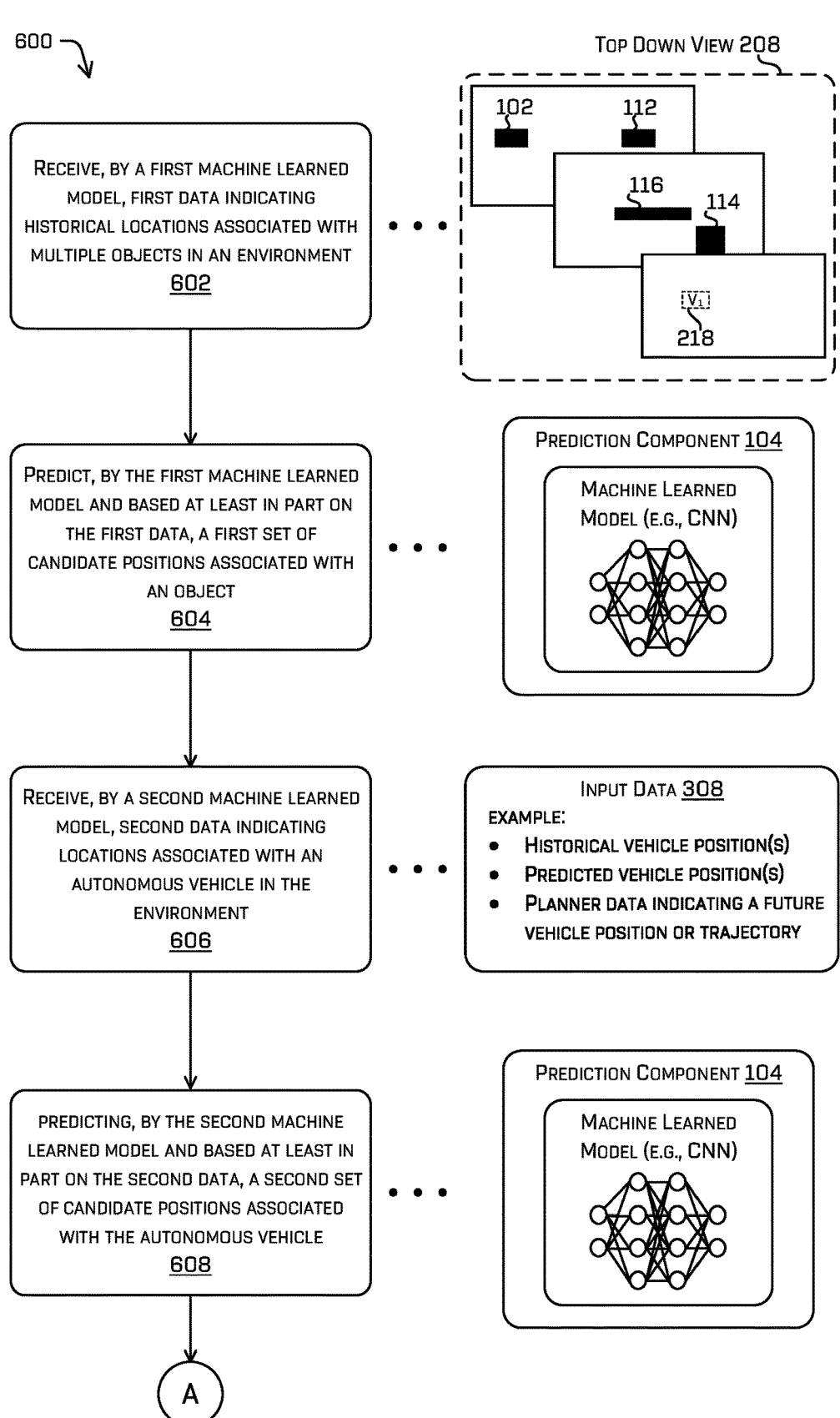

600

TOP DOWN VIEW 208

102   112

116   114

V₁

218

RECEIVE, BY A FIRST MACHINE LEARNED MODEL, FIRST DATA INDICATING HISTORICAL LOCATIONS ASSOCIATED WITH MULTIPLE OBJECTS IN AN ENVIRONMENT
602

PREDICT, BY THE FIRST MACHINE LEARNED MODEL AND BASED AT LEAST IN PART ON THE FIRST DATA, A FIRST SET OF CANDIDATE POSITIONS ASSOCIATED WITH AN OBJECT
604

PREDICTION COMPONENT 104

MACHINE LEARNED MODEL (E.G., CNN)

RECEIVE, BY A SECOND MACHINE LEARNED MODEL, SECOND DATA INDICATING LOCATIONS ASSOCIATED WITH AN AUTONOMOUS VEHICLE IN THE ENVIRONMENT
606

INPUT DATA 308

EXAMPLE:
- HISTORICAL VEHICLE POSITION(S)
- PREDICTED VEHICLE POSITION(S)
- PLANNER DATA INDICATING A FUTURE VEHICLE POSITION OR TRAJECTORY

PREDICTING, BY THE SECOND MACHINE LEARNED MODEL AND BASED AT LEAST IN PART ON THE SECOND DATA, A SECOND SET OF CANDIDATE POSITIONS ASSOCIATED WITH THE AUTONOMOUS VEHICLE
608

PREDICTION COMPONENT 104

MACHINE LEARNED MODEL (E.G., CNN)

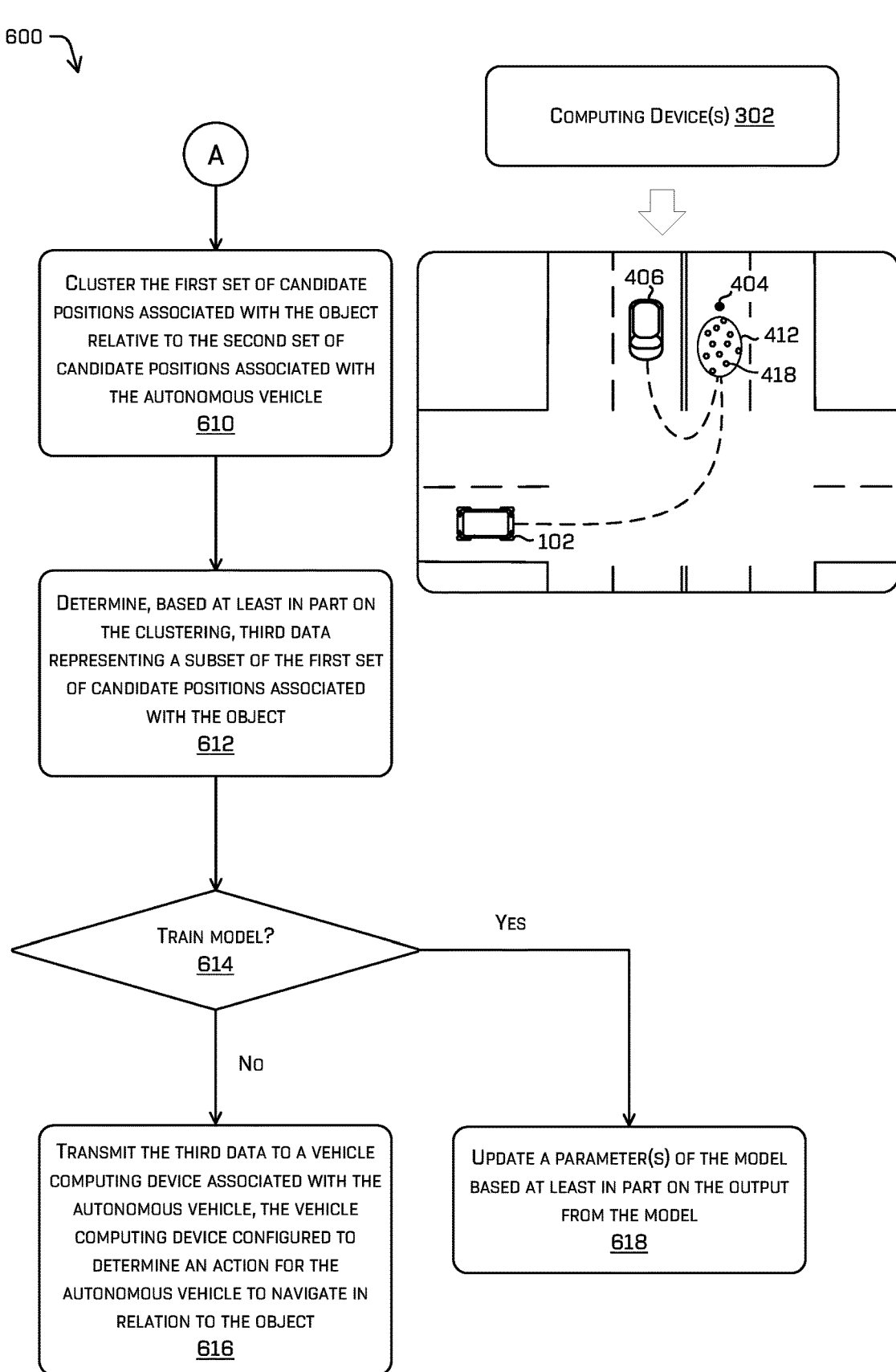

CLUSTER THE FIRST SET OF CANDIDATE POSITIONS ASSOCIATED WITH THE OBJECT RELATIVE TO THE SECOND SET OF CANDIDATE POSITIONS ASSOCIATED WITH THE AUTONOMOUS VEHICLE
610

DETERMINE, BASED AT LEAST IN PART ON THE CLUSTERING, THIRD DATA REPRESENTING A SUBSET OF THE FIRST SET OF CANDIDATE POSITIONS ASSOCIATED WITH THE OBJECT
612

TRAIN MODEL?
614

YES

NO

TRANSMIT THE THIRD DATA TO A VEHICLE COMPUTING DEVICE ASSOCIATED WITH THE AUTONOMOUS VEHICLE, THE VEHICLE COMPUTING DEVICE CONFIGURED TO DETERMINE AN ACTION FOR THE AUTONOMOUS VEHICLE TO NAVIGATE IN RELATION TO THE OBJECT
616

UPDATE A PARAMETER(S) OF THE MODEL BASED AT LEAST IN PART ON THE OUTPUT FROM THE MODEL
618

FIG. 6B

CONDITIONAL OBJECT POSITION PREDICTION BY A MACHINE LEARNED MODEL

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting future object locations in the environment helps to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6A is a first part of a flowchart depicting an example process for determining object positions using one or more example models.

FIG. 6B is a second part of the flowchart depicting an example process for determining object positions using one or more example models.

DETAILED DESCRIPTION

Figure 1:
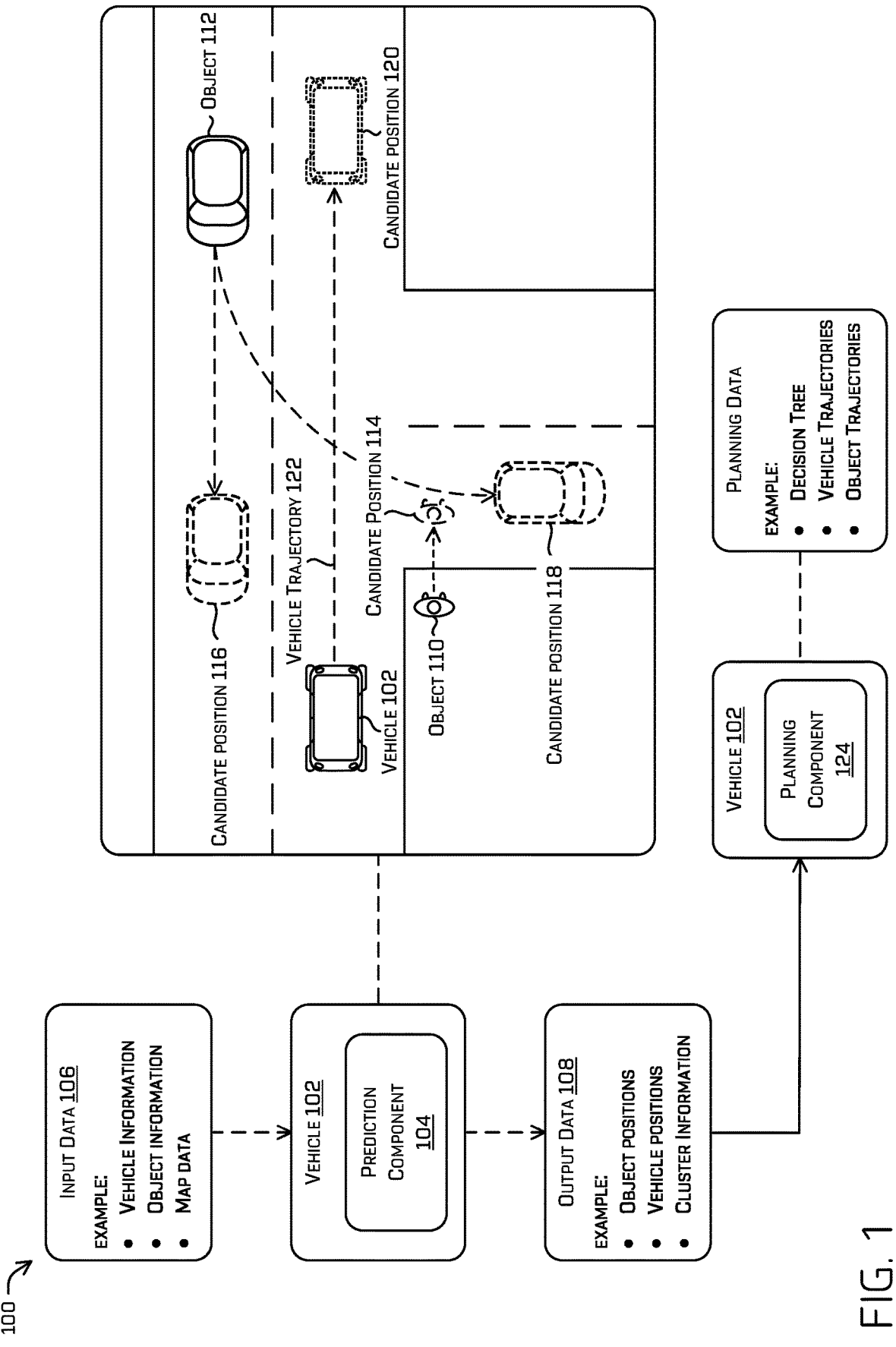
FIG. 1 is an illustration of an autonomous vehicle in an example environment, in which an example machine learned model may process input data to predict object positions.

This application describes techniques for predicting positions for an object in an environment. For example, the computing device can determine multiple positions, or candidate positions, for the object corresponding to different times in the future. In some examples, the computing device can determine the object positions based on a predicted position of an autonomous vehicle in the environment. For example, the computing device can predict positions for an object based on how the autonomous vehicle would behave in response to the object moving to the predicted positions. In some examples, the object positions determined by the computing device may be considered during vehicle planning thereby improving vehicle safety as the autonomous vehicle navigates in the environment by planning for the possibility that an object may occupy various positions.

In some examples, the computing device can implement a model (e.g., a prediction component) to predict object positions based on input data indicating a position(s) that the autonomous vehicle is likely to occupy in the future. For instance, the model can receive a predicted position of the autonomous vehicle (e.g., from a prediction component or a planning component of the computing device) and determine output data representing object positions for one or more objects that can affect the autonomous vehicle during navigation to the predicted position. In some examples, the model may receive a single position for the autonomous vehicle N seconds in the future, where N in an integer. In other examples, the model can receive a trajectory for the autonomous vehicle that indicates multiple positions along the trajectory for consideration to determine object positions.

The input data for the model can also or instead include object position data associated with multiple objects in the environment at a previous time and/or over a previous time period. For instance, the input data can indicate historical object positions by dynamic objects (e.g., a pedestrian, another vehicle, etc.) over time to capture different potential actions by the object such as whether the object will perform a U-turn, a left-turn, remain stationary, change lanes, or the like. The model can output a threshold number of object positions that collectively represent the different potential actions by the object, even if an action is associated with a relatively low likelihood of occurring (e.g., a U-turn is less likely to occur than the object proceeding straight). By outputting a threshold number of object positions as described herein, the model can determine output data that captures potentially adverse behavior by the object. As used herein, adverse behavior by the object means a behavior by the object that affects or has the potential to affect operation of the vehicle such as requiring the vehicle to move or change speed to avoid a collision or near miss (e.g., moves towards the autonomous vehicle, sudden or erratic actions, etc.).

In some examples, the object positions output by the model may be further processed by a same or different model to determine a subset of the object positions. For example, a model can cluster the object positions output by the model based on the predicted position(s) of the autonomous vehicle. For example, the model can determine a first cluster of at least some of a set of candidate positions associated with the object that cause a first behavior of the autonomous vehicle at a future time, and determine a second cluster of at least some of the set of candidate positions associated with the object that cause a second vehicle behavior of the autonomous vehicle at the future time. The first vehicle behavior and/or the second vehicle behavior can represent a braking action, steering action, acceleration action, or other action by the autonomous vehicle. For example, the clusters can be based on a vehicle performing a particular action in response to an object occupying any of the candidate positions in the first cluster. That is, the model can determine candidate object positions for inclusion in the first cluster or the second cluster based on a response by the vehicle to the object being at one of the candidate positions in the respective cluster (e.g., the vehicle may brake responsive to an object in the first cluster or change lanes responsive to an object in the second cluster). While only two clusters/behaviors are described in this example, any number of clusters/behaviors may be output by the model in other examples depending on features of the environment (e.g., a number of lanes, potential locations for a vehicle and/or object, etc.). Further description of determining clusters can be found throughout this disclosure including in relation to the figures below.

Data output by the model can be used in a variety of ways. For example, output data representing positions that an object may occupy at a future time can be transmitted to a computing device or component configured to control an autonomous vehicle. For example, object positions (also referred to as candidate object positions) can be transmitted to a planning component of a vehicle computing device that is configured to determine planning data (e.g., a vehicle trajectory, an object trajectory, an output by a decision tree, etc.). In some examples, the output data by the model can be used to perform a simulation, control a vehicle, validate or test performance of a vehicle or component thereof, among others. By way of example and not limitation, a model can determine object positions for use in a decision tree to control the autonomous vehicle (e.g., a reference action associated with an object position can be included in a decision tree). The object positions output by the model can improve vehicle planning operations by enabling more realistic reference actions in a decision tree (e.g., to plan for a greater variance of potential object positions).

In some examples, one or more machine learned models may receive historical data indicating previous positions associated with one or more objects in an environment (e.g., a real-world environment or a simulated environment) and output candidate object positions that an object may occupy in the future. The machine learned model(s) may also receive vehicle data indicating previous positions or a predicted position associated with an autonomous vehicle in the environment as input data, and output candidate vehicle positions that the autonomous vehicle may occupy in the future.

In various examples, the candidate object positions output by the model can be associated with a cluster, a dataset, a distribution, or the like. For instance, the model(s) can determine clusters of object positions relative to one of the candidate vehicle positions based on each of the object positions in a respective cluster causing a same vehicle action. For example, the model can assign multiple object positions to a cluster based on determining that the vehicle action at a future time is the same for each candidate object position in the cluster (e.g., when occupied by an object). The object positions can be determined independent of knowing a start position for an object or tracking the object to the candidate object position (thereby saving computational resources otherwise associated therewith). The start position may, for instance, represent a previous location of the object prior to occupying a candidate position. In various examples, the candidate positions may be determined based on a number of times objects occupied various positions in the environment over a previous time period.

In some examples, the input data for the model(s) can include a top-down representation (e.g., such that multiple layers or channels of an "image" represent data of the environment from a perspective of looking down at a driving surface) and/or a feature vector of the environment (e.g., some embedding or encoding representative of the environment), the object, and/or the autonomous vehicle. In some examples, a computing device can receive sensor data, log data, map data, and so on, as input and determine top-down representations and/or feature vectors representing an object, a vehicle, and/or an environment. For example, a machine learned model (e.g., a graph neural network) can determine the feature vectors based at least in part on input data representing an object position, an object trajectory, an object state, vehicle information, a simulated scene, a real-world scene, etc. The computing device can receive the feature vectors from the machine learned model as part of the input data. In various examples, the feature vectors may be generated to represent a current state of the object (e.g., a heading, a speed, etc.) and/or a behavior of the object over time (e.g., a change in yaw, speed, or acceleration of the object). In some examples, the machine learned model determines additional feature vectors to represent other objects and/or features of the environment.

In some examples, a machine learned model may receive a vector representation of data compiled into an image format representing a top-down view of an environment. The top-down view may be determined based at least in part on map data and/or sensor data captured from or associated with a sensor of an autonomous vehicle in the environment. The vector representation of the top-down view can represent one or more of: an attribute (e.g., position, class, velocity, acceleration, yaw, turn signal status, etc.) of an object, history of the object (e.g., location history, velocity history, etc.), an attribute of the vehicle (e.g., velocity, position, etc.), crosswalk permission, traffic light permission, and the like. The data can be represented in a top-down view of the environment to capture context of the autonomous vehicle (e.g., identify actions of other vehicles and pedestrians relative to the vehicle).

In some examples, a machine learned model may receive, as input data, vector representation(s) of data associated with one or more objects in the environment. For instance, the machine learned model can receive (or in some examples determine) one or more vectors representing one or more of: position data, orientation data, heading data, velocity data, speed data, acceleration data, yaw rate data, or turning rate data associated with the object.

In various examples, the computing device (e.g., a vehicle computing device) may be configured to determine actions for a vehicle to take while operating (e.g., trajectories to use to control the vehicle) based on predicted object positions determined by one or more models. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

For each applicable action and sub-action, the vehicle computing system may implement different model(s) and/or component(s) to simulate future states (e.g., estimated states) by projecting an autonomous vehicle and relevant object(s) forward in the environment for the period of time (e.g., 5 seconds, 8 seconds, 12 seconds, etc.). The model(s) may project the object(s) (e.g., estimate future positions of the object(s)) forward based on a predicted trajectory associated therewith. For instance, the model(s) may predict a trajectory of a vehicle and predict attributes about the vehicle including whether the trajectory will be used by the vehicle to arrive at a predicted location in the future. The vehicle computing device may project the vehicle forward (e.g., estimate future positions of the vehicle) based on the vehicle trajectories output by the model. The estimated state(s) may represent an estimated position (e.g., estimated location) of the autonomous vehicle and an estimated position of the relevant object(s) at a time in the future. In some examples, the vehicle computing device may determine relative data between the autonomous vehicle and the object (s) in the estimated state(s). In such examples, the relative data may include distances, locations, speeds, directions of travel, and/or other factors between the autonomous vehicle and the object. In various examples, the vehicle computing device may determine estimated states at a pre-determined rate (e.g., 10 Hertz, 20 Hertz, 50 Hertz, etc.). In some examples, the rate at which the estimated states are determined may vary over time and/or based on one or more conditions (e.g., speed of the vehicle, speed of objects in the environment, number of objects in the environment, type of operational drive domain (e.g., residential street vs. highway), whether the vehicle is occupied, etc. In at least one example, the estimated states may be performed at a rate of 10 Hertz (e.g., 80 estimated intents over an 8 second period of time).

In various examples, the vehicle computing system may store sensor data associated with an actual location of an object at the end of the set of estimated states (e.g., end of the period of time) and use this data as training data to train one or more models. For example, stored sensor data (or perception data derived therefrom) may be retrieved by a model and be used as input data to identify cues of an object (e.g., identify a position, a feature, an attribute, or a pose of the object). Such training data may be determined based on manual annotation and/or by determining a change associated semantic information of the position and/or orientation of the object between times in the stored data. Further, detected positions over such a period of time associated with the object may be used to determine a ground truth position to associate with the object.

In some examples, the vehicle computing device may provide data such as log data, sensor data, training data, etc. to a remote computing device (i.e., computing device separate from vehicle computing device) for data analysis. In such examples, the remote computing device may analyze the data to determine one or more labels for images, an actual location, yaw, speed, acceleration, direction of travel, or the like of the object at the end of the set of estimated states. In some such examples, ground truth data may be associated with one or more of: positions, trajectories, accelerations, and/or directions of objects represented in the stored data. The ground truth data may be determined (either hand labelled or determined by another machine learned model) and such ground truth data may be used to determine a position of an object. In some examples, corresponding data may be input into the model to determine an output and a difference between the determined output, and the actual action by the object (or actual position data) may be used to train the model.

The machine learned model may be configured to determine a predicted position of each object in an environment (e.g., a physical area in which a vehicle operates and/or a simulated environment). In some examples, the environment can be determined based on sensor data from one or more sensors associated with the vehicle. The object positions predicted by the models described herein may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof.

As described herein, models may be representative of machine learned models, statistical models, heuristic models, or a combination thereof. That is, a model may refer to a machine learning model that learns from a training dataset to improve accuracy of an output (e.g., a prediction). Additionally or alternatively, a model may refer to a statistical model that is representative of logic and/or mathematical functions that generate approximations which are usable to make predictions.

The techniques discussed herein may improve a functioning of a vehicle computing system in a number of ways. The vehicle computing system may determine an action for the autonomous vehicle to take based on predicted position data associated with one or more objects. In some examples, using the position prediction techniques described herein, a model may output object positions and associated probabilities that improve safe operation of the vehicle by accurately characterizing future positions of the object with greater detail as compared to previous models. In addition, by clustering object positions relative to a vehicle behavior or position, object positions that cause different vehicle actions in the future can be considered during planning operations.

The techniques discussed herein can also improve a functioning of a computing device in a number of additional ways. In some cases, representing the environment and the object(s) as feature vectors can represent a simplified representation of the environment for the purposes of generating prediction position(s). In some cases, evaluating an output by a model(s) may allow an autonomous vehicle to generate more accurate and/or safer trajectories for the autonomous vehicle to traverse an environment using fewer computational resources. In at least some examples described herein, predicted object positions may account for object to object dependencies and/or relatively rare actions by objects, yielding safer decision-making of the system. These and other improvements to the functioning of the computing device are discussed herein.

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

FIG. 1 illustrates an autonomous vehicle (vehicle 102) in an example environment 100, in which an example machine learned model (prediction component 104) may process input data to predict object positions. As illustrated, the vehicle 102 includes the prediction component 104 that represents one or more models (e.g., a machine learned model) for processing various types of input data 106 (e.g., vehicle information, object information, map data, etc.) associated with the one or more objects in the environment 100, and determines output data 108 representing object positions, vehicle positions, and/or cluster information usable for simulation, controlling the vehicle, or the like. In some examples, the prediction techniques described herein may be implemented at least partially by or in association with a vehicle computing device (e.g., vehicle computing device 504) and/or a remote computing device (e.g., computing device(s) 534).

In various examples, a vehicle computing device associated with the vehicle 102 may be configured to detect one or more objects (e.g., objects 110 and 112) in the environment 100, such as via a perception component. In some examples, the vehicle computing device may detect the objects, based on sensor data received from one or more sensors. In some examples, the sensors may include sensors mounted on the vehicle 102, and include, without limitation, ultrasonic sensors, radar sensors, light detection and ranging (lidar) sensors, cameras, time of flight (ToF) sensors, microphones, inertial sensors (e.g., inertial measurement units, accelerometers, gyros, etc.), global positioning satellite (GPS) sensors, and the like. In various examples, the vehicle 102 may be configured to transmit and/or receive data from other autonomous vehicles and/or other sensors in the environment. The data may include sensor data, such as data regarding the objects detected in the environment 100.

In various examples, the vehicle computing device can receive the sensor data and can semantically classify the detected objects (e.g., determine an object type), such as, for example, whether the object is a pedestrian, such as object 110, a vehicle such as object 112, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential trajectories by an object may be considered based on characteristics of the object (e.g., how the object may potentially move in the environment).

Generally, the prediction component 104 provides functionality to determine a candidate position 114 for the object 110, candidate positions for the object 112 (e.g., candidate position 116 and candidate position 118), and/or a candidate position 120 the vehicle 102. A candidate position can be thought of as a position of a respective object (or vehicle) at a future time and can include an area corresponding to a size of each object. The environment 100 can include any number of objects, and each object can be associated with one or more candidate positions. For example, the object 110 can potentially occupy positions in the environment 100 other than the candidate position 114 at a point in time, and can further occupy various positions over a time period (e.g., assuming the pedestrian moves).

In some examples, the prediction component 104 can generate the output data 108 for different times in the future. For instance, at a given time, the prediction component 104 can generate the output data 108 for different times in the future (e.g., every 0.1 second for four second, or some other time period or frequency). In various examples, the prediction component 104 can iteratively determine the output data 108 for each future time based at least in part on the output data 108 associated with a previous time. In other words, the prediction component 104 can predict object positions for different times in the future with later times considering potential actions by an object at a previous time.

The candidate position 120 for the vehicle 102 can represent, for example, a predicted position that the vehicle 102 navigates to at a future time (e.g., six second in the future, or other timeframe). In some examples, the prediction component 104 can receive the candidate position 120 as input data. The prediction component 104 can, for instance, receive position data comprising one or more future vehicle positions. In various examples, the prediction component 104 can receive a vehicle trajectory 122 and determine positions along the vehicle trajectory at different times over a time period, including the candidate position 120. For example, the vehicle 102 may occupy various positions prior to reaching the candidate position 120, and the prediction component 104 can identify candidate positions for the vehicle 102 for different times in the future.

In various examples, the candidate positions for one or more objects (e.g., the candidate position 114, the candidate position 116, and the candidate position 118) may be predicted, generated, or otherwise determined by the prediction component 104 based at least in part on the candidate position(s) of the vehicle 102. For instance, the prediction component 104 can receive the candidate position 120 as the input data 106 (e.g., from a prediction component, planning component, or other component), and output the object candidate positions that, if occupied by an object, invokes different reactions by the vehicle 102 to avoid the respective object.

By way of example and not limitation, the prediction component 104 can determine the object candidate positions based at least in part on a vehicle candidate position(s). For instance, the prediction component 104 can cluster object candidate positions relative to the candidate position 120 such that a response by the vehicle 102 is the same for each object candidate position in a respective cluster. In FIG. 1, the candidate position 114 for the pedestrian object 110 may be in a different cluster than the candidate position 118 for the vehicle object 112 given that the candidate position 114 does not affect the vehicle 102 progress to reach the candidate position 120 (e.g., a first vehicle behavior) whereas the candidate position 118 may cause the vehicle 102 to brake (e.g., a second vehicle behavior). Additional discussion of clustering can be found throughout this disclosure, including in FIGS. 2-6.

In some examples, the prediction component 104 may be configured to receive and/or determine vector representations of one or more of: environment data (e.g., top-down view data), object state(s), and vehicle state(s). For example, the prediction component 104 can include a machine learned model (e.g., a Graph Neural Network (GNN)) to generate one or more vectors to represent features of the environment (e.g., a roadway, a crosswalk, a building, etc.), a current state of an object (e.g., the pedestrian object 110 and/or the vehicle object 112), and/or a current state of the vehicle 102. In other examples, the feature vector(s) can represent a rasterized image based on top-down view data. Additional details about inputs to the prediction component 104 are provided throughout this disclosure. Additional details of predicting object locations using a GNN are described in U.S. patent application Ser. No. 17/535,357, filed on Nov. 24, 2021, entitled "Encoding Relative Object Information Into Node Edge Features," which is incorporated herein by reference in its entirety and for all purposes.

The output data 108 from the prediction component 104 can be used by a vehicle computing device in a variety of ways. For instance, the prediction component 104 can transmit the output data 108 to a planning component 124 of the vehicle computing device to control the vehicle 102 in the environment 100 (e.g., determine a candidate vehicle trajectory and/or control a propulsion system, a braking system, or a steering system). In some examples, the planning component 124 can determine planning data for the vehicle 102 to navigate in the environment. The planning data can include one or more vehicle trajectories (candidate trajectories to avoid objects), one or more object trajectories, just to name a few. The planning data can also or instead represent determinations made by a decision tree that is configured with reference actions corresponding to different object positions output from the prediction component 104.

A training component of a remote computing device, such as the computing device(s) 534 (not shown) and/or the vehicle computing device 504 (not shown) may be implemented to train the prediction component 104. Training data may include a wide variety of data, such as image data, video data, lidar data, radar data, audio data, other sensor data, etc., that is associated with a value (e.g., a desired classification, inference, prediction, etc.). In some examples training data can comprise determinations based on sensor data, such as a bounding boxes (e.g., two-dimensional and/or three-dimensional bounding boxes associated with an object), segmentation information, classification information, an object trajectory, and the like. Such training data may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth.

Figure 2:
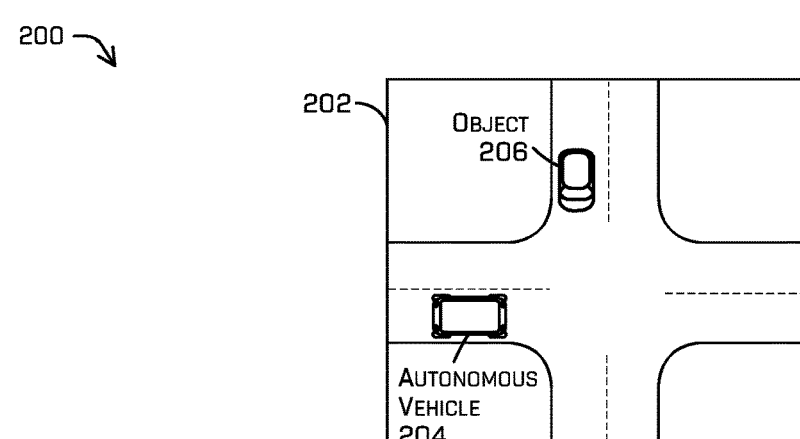
FIG. 2 illustrates an example block diagram of an example computer architecture for implementing techniques to generate example feature vectors, as described herein.
Figure 2:
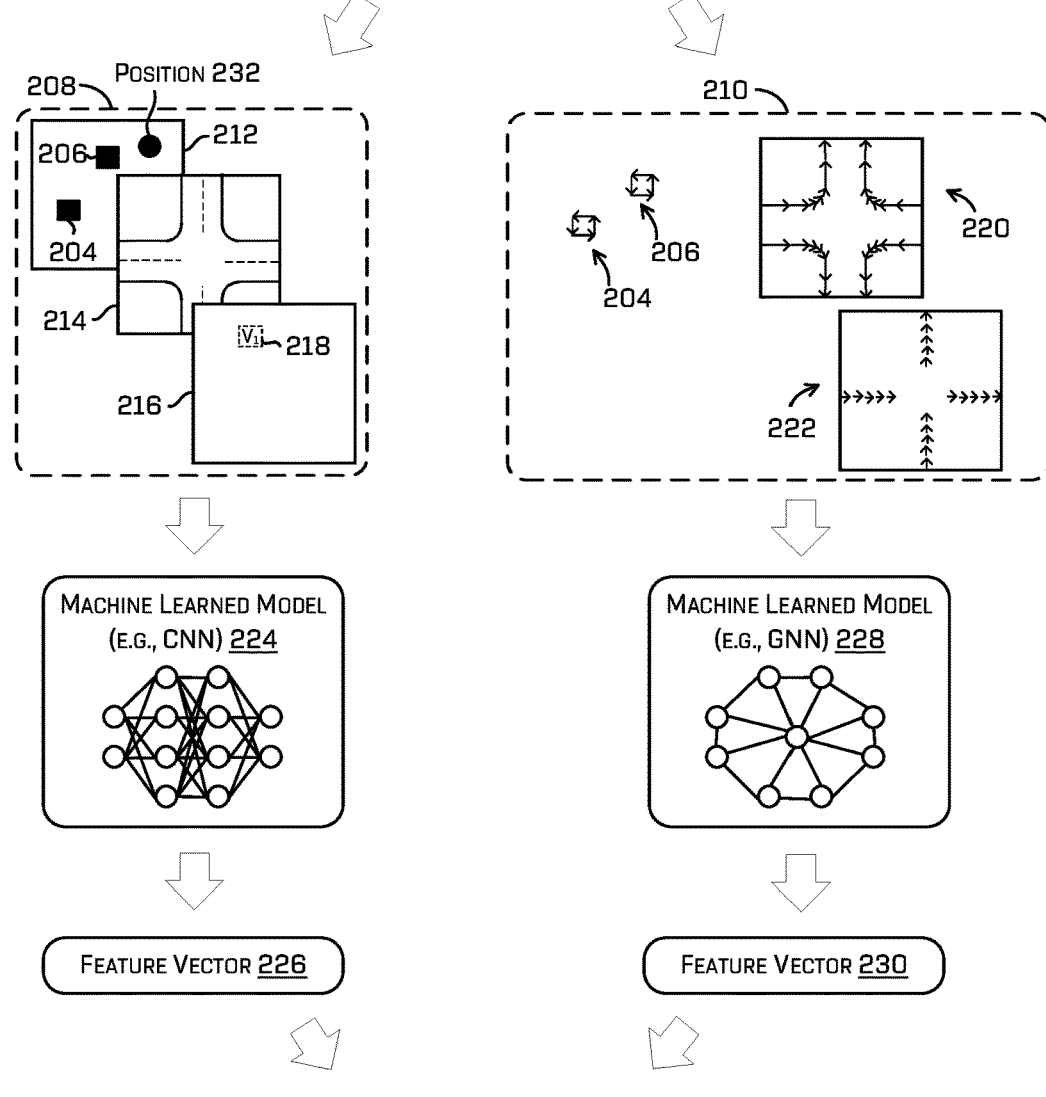

FIG. 2 illustrates an example block diagram of an example computer architecture 200 for implementing techniques to generate example feature vectors, as described herein. The example computer architecture 200 includes a computing device that includes the prediction component 104 in FIG. 1, however in other examples the techniques described in the example computer architecture 200 may be performed by the vehicle computing device(s) 504 and/or the computing device(s) 534. The feature vectors can, for instance, be used as input to the prediction component 104.

As illustrated, the computing device can receive and/or determine data associated with an environment 202 (or alternatively the example environment 100). For example, the computing device can receive data about objects in the environment from the perception component 522 and can receive data about the environment itself from the localization component 520, the perception component 522, and the one or more maps 528. By way of example and not limitation, the computing device may receive sensor data associated with an autonomous vehicle 204 and an object 206 and determine, based at least in part on the sensor data, data comprising a top-down representation 208 of the environment 202 and/or a vector representation 210 of the environment 202.

In some examples, the vector representation 210 (e.g., feature vectors) can be determined by a graph neural network which is a type of neural network which operates on a graph structure. In various examples, the graph neural network may be partially connected or fully connected with separate edge features associated with distinct pairs of nodes in the graph neural network. Machine-learning based inference operations may be performed to update the state of the graph neural network, including updating nodes and/or edge features, based on internal inputs determined from the graph neural network itself and/or based on updated observations perceived by the autonomous vehicle in the environment. Updates to the graph neural network may represent predicted future states of the environment, and the autonomous vehicle may decode portions of the graph neural network to determine predictions for entity positions, velocities, trajectories, and/or other updated predicted states for the entities in the environment.

The vector representation 210 may, in some examples, be determined based on a polyline (e.g., a set of line segments) representing one or more map elements. For instance, the graph neural network can encode and aggregate the polyline into a node data structure representing with the map element (s). For example, an object or feature of the environment can be represented by polylines (e.g., a lane can be segmented into a number of smaller line segments whose length, location, orientation angle (e.g., yaw), and directionality, when aggregated, define the lane). Similarly, a crosswalk may be defined by four connected line segments, and a roadway edge or roadway centerline may be multiple connected line segments.

Each polyline in this example may include one or more points and/or line segments that can be represented as vectors. For instance, each line segment in a roadway, lane, or crosswalk, etc., may be defined by a position, length, orientation, directionality, and/or other attributes. The attributes associated with a line segment may be stored in a vector data structure representing the line segment, and each line segment in the polyline associated with the same map element may be encoded and aggregated into a node structure. In addition to the attributes associated with individual line segments of polyline (e.g., position, length, and orientation), additional attributes may be associated with the map element itself (e.g., map element type, directionality, permissibility, etc.). Additional details of graph neural networks are described in U.S. patent application Ser. No. 17/187,170, filed on Feb. 26, 2021, entitled "Graph Neural Network With Vectorized Object Representations in Autonomous Vehicle Systems," which is incorporated herein by reference in its entirety.

Generally, the top-down representation 208 can represent an area around the autonomous vehicle 204. In some examples, the area can be based at least in part on an area visible to sensors (e.g., a sensor range), a receding horizon, an area associated with an action (e.g., traversing through an intersection), and the like. In some examples, the top-down representation 208 may represent a 100 meter×100 meter area around the autonomous vehicle 204, although any area is contemplated. In various examples, the top-down representation 208 may be determined based at least in part on map data and/or sensor data captured from or associated with a sensor of the autonomous vehicle 204 in the environment 202.

In various examples, the top-down representation 208 of the environment 202 may be representative of a top-down perspective of the environment and may comprise one or more multi-channel image(s) such as a first channel 212, a second channel 214, and a third channel 216. The computing device can generate or determine the multi-channel image(s) to represent different attributes of the environment 202 with different channel images. For instance, an image having multiple channels, wherein each channel is representative of some information (semantic or otherwise). In some examples, one of the channel images (e.g., first channel 212, second channel 214, or third channel 216) can represent a vehicle position, an object position, a feature of the environment, an object velocity 218, an object heading, an object acceleration, an object yaw, an attribute of the object, crosswalk permission (e.g., a crosswalk light or audio state), and traffic light permissibility (e.g., a traffic light state), just to name a few. In this way, the top-down representation 208 can represent objects in the environment (e.g., represented by a bounding box, as discussed herein), semantic information about the object (e.g., a classification type), movement information (e.g., velocity information, acceleration information, etc.), and the like. Additional details of using to-down representations are described in U.S. patent application Ser. No. 16/504,147, filed on Jul. 5, 2019, entitled "Prediction on Top-Down Scenes Based On Action Data."

FIG. 2 shows that the environment 202 may also or instead be represented by the vector representation 210 comprising vectors to represent objects and/or features of the environment including one or more of: an attribute (e.g., position, velocity, acceleration, yaw, etc.) of the object 206, history of the object 206 (e.g., location history, velocity history, etc.), an attribute of the autonomous vehicle 204 (e.g., velocity, position, etc.), history of the autonomous vehicle 204 (e.g., location history, velocity history, etc.), and/or features of the environment 202 (e.g., roadway boundary, roadway centerline, crosswalk permission, traffic light permission, and the like). For instance, the vector representation 210 can comprise vectors to represent features of the environment including roadway boundary vectors 220 and roadway centerline vectors 222.

In various examples, the example computer architecture 200 can include a computing device generating the vector representation 210 based at least in part on state data associated with the autonomous vehicle 204 and/or the object 206. The state data can include data describing an object (e.g., the object 206 or the pedestrian object 110, the vehicle object 112 in FIG. 1) and/or a vehicle (e.g., vehicle 102) in an environment, such as in example environment 100. The state data can include, in various examples, one or more of position data, orientation data, heading data, velocity data, speed data, acceleration data, yaw rate data, or turning rate data associated with the object and/or the vehicle. In some examples, vectors associated with an environment, a vehicle state, and/or an object state may be combined as the vector representation 210 (e.g., vectors may be concatenated).

In some examples, the top-down representation 208 may be input into a machine learned model 224 (e.g., a convolutional neural network (CNN)), which can determine a feature vector 226 for input into a prediction component 104. Additionally or alternatively, the vector representation 210 may be input into a machine learned model (e.g., a graph neural network (GNN)) which can determine a feature vector 230 for input into the prediction component 104. The feature vector 226 can represent an association between the one or more channels of the top-down representation 208 while the feature vector 230 can represent an association between the vectors of the vector representation 210. The prediction component 104 can process the feature vector 226 and/or the feature vector 230 to determine the output data 108 indicative of predicted positions for the object 206, or another object different from the object 206.

In various examples, the computing device generating feature vectors based at least in part on state data associated with a vehicle and/or object(s). The state data can include data describing an object (e.g., the pedestrian object 110, the vehicle object 112 in FIG. 1) and/or a vehicle (e.g., vehicle 102) in an environment, such as in example environment 100. The state data can include, in various examples, one or more of position data, orientation data, heading data, velocity data, speed data, acceleration data, yaw rate data, or turning rate data associated with the object and/or the vehicle.

In some examples, sensor data or processed sensor data (e.g., a top-down representation) may be input into a machine learned model (e.g., a convolutional neural network (CNN), a Recurrent Neural Network (RNN), a graph neural network (GNN), etc.), which can determine a feature vector for processing by a machine learned model.

In various examples, the top-down representation 208 and/or the vector representation 210 can include a predicted position of the autonomous vehicle 204 (shown as position 232 in the top-down representation 208). The predicted position can represent a position that the autonomous vehicle 204 may occupy in the future, and may be determined based on historical locations of the autonomous vehicle 204 (and/or another autonomous vehicle in a fleet of vehicle) over a previous time period. In some examples, the predicted position can represent a position determined by a prediction component and/or a planning component of a vehicle computing device.

Figure 3:
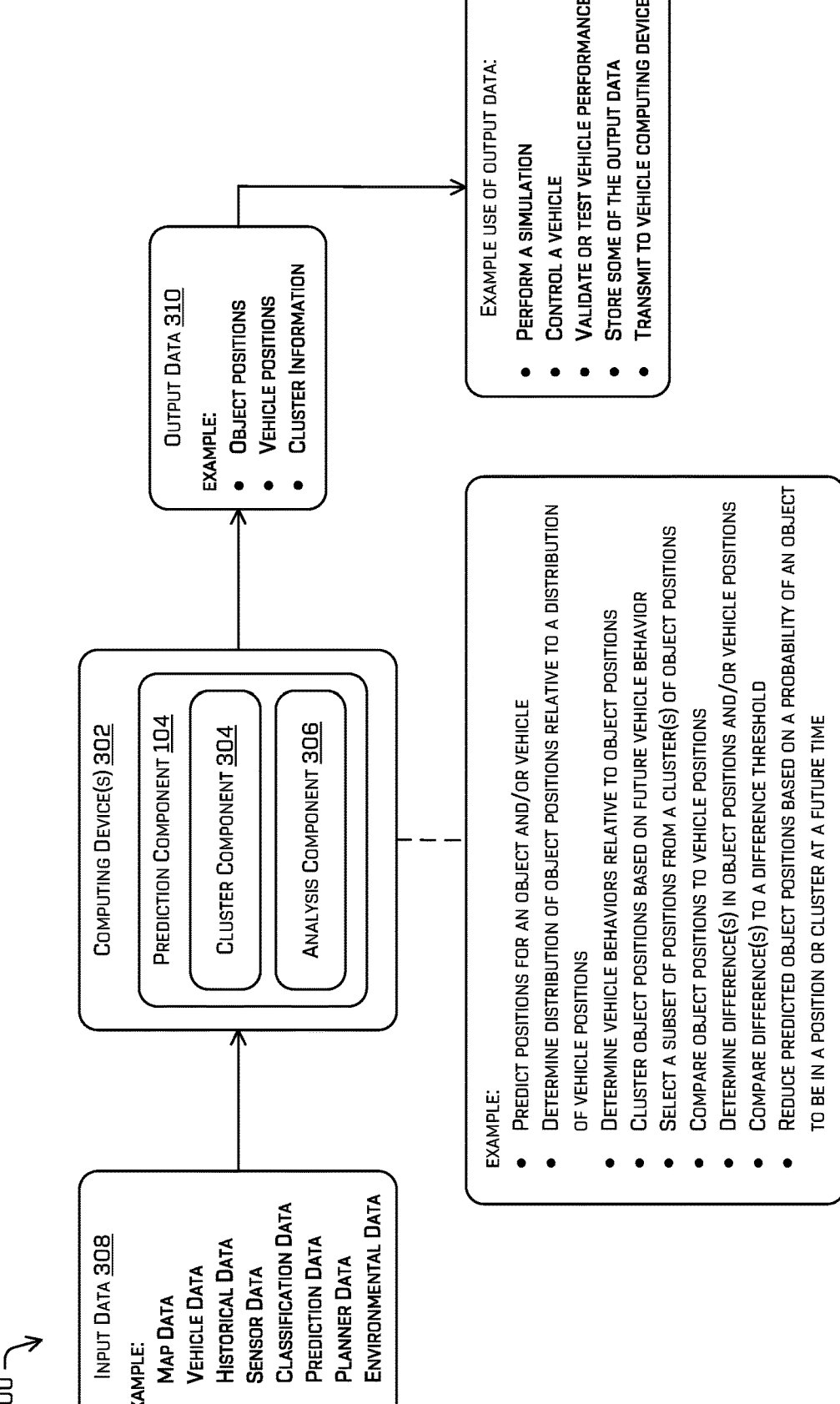
FIG. 3 illustrates another block diagram of an example computer architecture for implementing techniques to determine example object positions as described herein.

FIG. 3 illustrates an example block diagram 300 of an example computer architecture for implementing techniques to determine example object positions as described herein. For instance, a computing device(s) 302 includes the prediction component 104 of FIG. 1 which further includes a cluster component 304 and an analysis component 306. In various examples, the computing device(s) 302 can receive input data 308 for processing by one or more of the cluster component 304 and/or the analysis component 306, and determine output data 310 representing one or more object positions that an object may occupy at a future time. In some examples, the computing device(s) 302 may be associated with the vehicle computing device(s) 504 and/or the computing device(s) 534. In some examples, the techniques described in relation to FIG. 3 can be performed as the vehicle 102 navigates in the environment 100 (e.g., a real-world environment or a simulated environment).

In various examples, the computing device(s) 302 can receive the input data 308 and predict object positions in an environment relative to a predicted position of the vehicle 102. For example, the prediction component 104 can receive historical data indicating previous locations occupied by one or more objects and map data representing an environment. The prediction component 104 can also or instead receive vehicle data indicating a previous position(s) and/or a predicted position(s) of a vehicle (e.g., an autonomous vehicle). In some examples, the prediction component 104 can determine a first distribution or dataset of object positions and a second distribution or dataset of vehicle positions associated with a future time. The prediction component 104 can determine the output data 310 based at least in part on comparing object positions in the first distribution to vehicle positions and the second distribution. In various examples, a probability of a set of targets for the vehicle may be determined based on a set of histories for all objects (including the vehicle), as well as a target state associated with one of the objects. Mathematically, such a probability may be defined as $p(T_h|H_a \ldots H_h, t_{ka})$, where the "h" subscript is relative to the vehicle and "a" is relative to the object. Similarly, the target of the object, tka, may be expressed as a probability $p(t_{ka}|H_a \ldots H_h)$. In some examples, the target object probabilities may be limited based on kinematically feasible transitions given the histories of the objects and/or the vehicle. Regardless, both models may be machine learned models (e.g., neural networks or otherwise) and trained based on observed data.

In various examples, the computing device(s) 302 can implement the cluster component 304 to determine a cluster of one or more object positions in an environment (e.g., the outputs of the $p(t_{k,d})$). For example, the cluster component 304 can represent a model for clustering object positions predicted by the prediction component 104 (e.g., based on the historical data, map data, vehicle data, or the like).

In various examples, the clusters may be determined based on the predicted position(s) of the vehicle. Once clusters are determined, a score may be determined for one or more individual clusters of the set of clusters. As a non-limiting example of which, a score may comprise a sum of all probabilities over all positions in a cluster. Once scored, a position may be selected from each cluster. In some examples, such a position may be selected based on, for example, the cluster center, the most probable target of the cluster, a random target, and the like. Such selected positions may then be used to determine likely positions of the vehicle, as above. For example, the cluster component 304 can determine a first cluster of at least some of a set of candidate positions associated with an object that cause a first behavior of an autonomous vehicle at a future time, and determine a second cluster of at least some of the set of candidate positions associated with the object that cause a second vehicle behavior of the autonomous vehicle at the future time. The first vehicle behavior and/or the second vehicle behavior can represent a braking action, steering action, acceleration action, or other action by the autonomous vehicle.

By way of example and not limitation, the cluster component 304 can determine various behaviors or actions that may be required for the vehicle to reach the predicted vehicle positions. For example, the vehicle may control a braking system, change lanes, or remain stationary to navigate to the predicted vehicle position with consideration to traffic laws, roadways boundaries, and other features by way of the map data. In some examples, the object positions that may impact the future operation of the vehicle can be considered independent of where the object was located prior to being in the respective object position.

In some examples, clusters output by the cluster component 304 can be based on a vehicle performing a particular action in response to an object occupying one of the candidate positions in a respective cluster. The cluster component 304 can assign, select, or otherwise determine candidate object positions for inclusion in the first cluster or a second cluster based on a response by the autonomous vehicle to the object being at one of the candidate positions in the respective cluster (e.g., the vehicle may brake responsive to an object in the first cluster or change lanes responsive to an object in the second cluster).

For instance, the cluster component 304 can determine clusters of object positions relative to the predicted vehicle position(s) based on each of the object positions in a respective cluster causing a same vehicle action. For example, the model can assign multiple object positions to a cluster based on determining that the vehicle action at a future time is the same for each candidate object position in the cluster. In some examples, to save computational resources the object positions can be determined independent of knowing a start position for an object or tracking the object to the candidate object position. Accordingly, the predicted vehicle position can be used to condition how the object positions are clustered.

In various examples, the computing device(s) 302 can implement the analysis component 306 to analyze the input data 308 and/or an output from the cluster component 304

(e.g., object position data associated with one or more clusters). For example, the analysis component 306 can determine differences between distributions of object positions and the vehicle positions, and compare the differences to a difference threshold to identify a subset of object positions most relevant to the vehicle. In various examples, the analysis component 306 can reduce a number of predicted object positions based at least in part on the comparing.

In some examples, the analysis component 306 can determine a probability for an object to occupy a particular candidate object position such as based on historical object positions for a similar or same region in the environment. The analysis component 306 can also or instead determine a probability for an object to occupy a particular cluster for determining the subset of candidate object positions as the output data 310. The probability can be used by the analysis component 306 to reduce a number of candidate object positions as the output data 310 (e.g., a threshold number of object positions can be selected taking a top M candidate object positions having a range of probabilities, where M is an integer).

As depicted in FIG. 3, the input data 308 can represent one or more of: map data, vehicle data, sensor data, classification data, prediction data, planner data, and/or environmental data, though other data may also be considered. In some examples, the input data 308 can include predicted vehicle position information for the vehicle 102 and the cluster component 304 can determine clusters of object positions based on the predicted vehicle position information (e.g., one or more positions of the vehicle 102 in the future).

In some examples, a vector representation(s) (e.g., the feature vector 226 and/or feature vector 230) may be input into the prediction component 104 to determine the output data 310 indicative of predicted positions for the object(s) in the environment.

The output data 310 can represent one or more of: object positions (e.g., predicted object positions, candidate object positions), vehicle position(s) (e.g., a predicted vehicle position, a distribution of vehicle positions, etc.), and/or cluster information (e.g., data describing clusters associated with the object positions). In some examples, the output data 310 can be associated with a cluster, a dataset, a distribution, or the like.

Data output by the computing device(s) 302 can be used in a variety of ways. For example, output data representing object positions can be used to perform a simulation, control a vehicle, and/or validate or test vehicle performance, just to name a few. For example, the output data 310 can be used for validating, based at least in part on a result of the simulation, an output by a component configured to control the vehicle in the environment at a future time. For instance, the result of the simulation can be used to validate a determination or prediction from a planning component, prediction component, and the like. In some examples, at least a portion of the output data 310 can be stored in a storage device for access at a later time. For example, information about object positions and/or clusters may be stored in a database use as input data and/or training data. The object positions can, for instance, represent locations in an environment that an object may occupy at a future time.

In some examples, the computing device(s) 302 can transmit at least a portion of the output data 310 to a computing device or component configured to control an autonomous vehicle. For example, object positions can be transmitted to a planning component of a vehicle computing device that is configured to determine planning data (e.g., a vehicle trajectory, an object trajectory, an output by a decision tree, etc.).

In some examples, the output data 310 can be used to validate or test performance of a vehicle. For example, a safety system, such as a collision avoidance system, can receive object position data for processing. Additionally or alternatively, performance of a vehicle controller configured to control some aspect of the vehicle (e.g., a braking system, an acceleration system, and the like) can be validated by enabling the vehicle controller to receive the output data 310 as input.

The object positions associated with the output data 310 can be configured for use in a decision tree to control the vehicle. For instance, one or more object positions can be associated with a respective reference action, or node of the decision tree. As mentioned different object positions may be associated with different vehicle actions, so including the object positions in a decision tree as reference actions can improve vehicle planning operations by enabling more realistic reference actions in a decision tree (e.g., considering object positions associated with different the vehicle behaviors to plan for a greater variance of potential object actions).

Figure 4A:
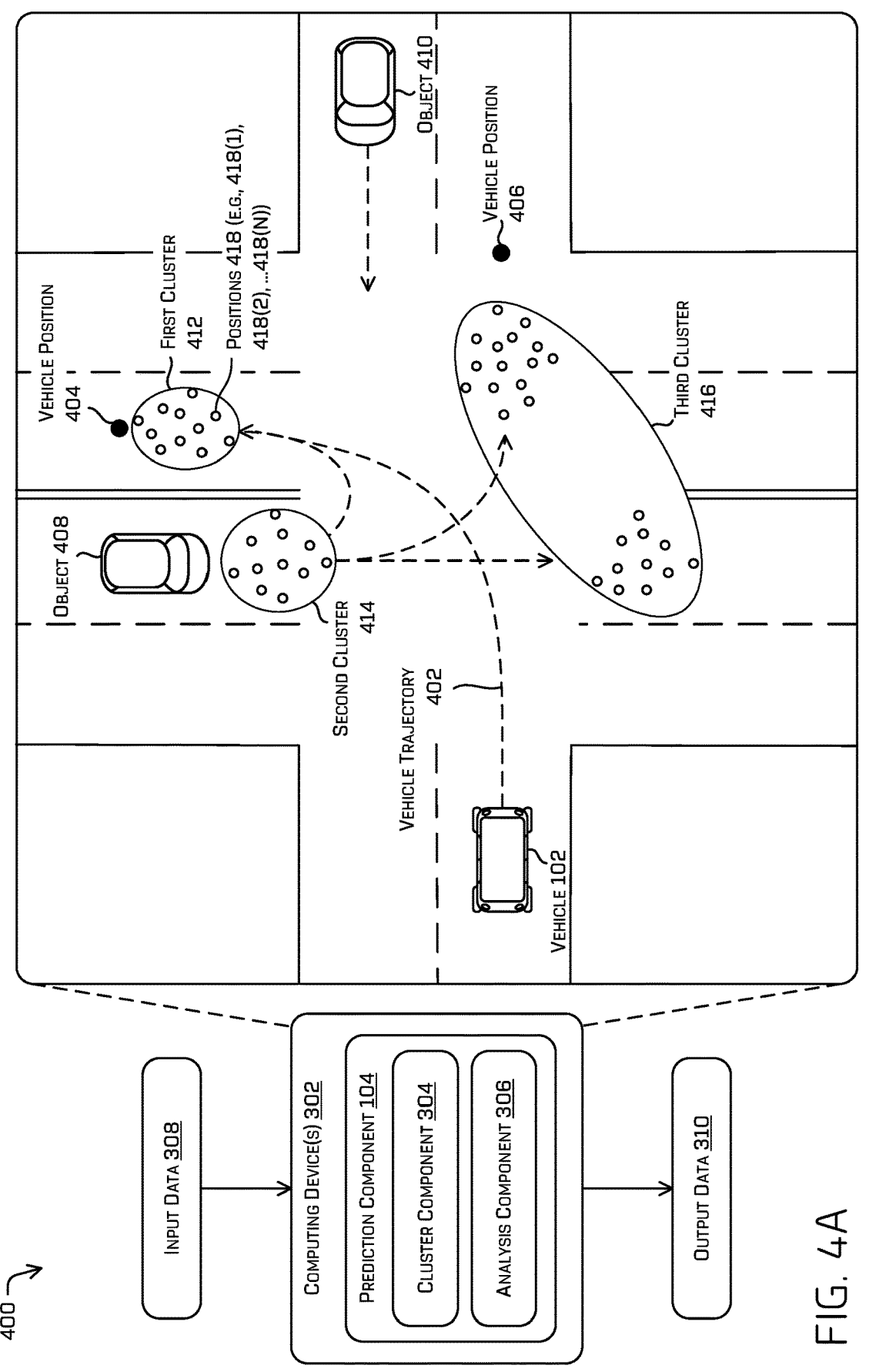
FIG. 4A illustrates an example block diagram of a computing device implementing an example prediction component to generate object position information.

FIG. 4A illustrates an example block diagram 400 of a computing device implementing an example prediction component to generate object position information. For instance, the computing device(s) 302 includes the prediction component 104 of FIG. 1 which further includes the cluster component 304 and an analysis component 306 to determine the output data 108 representing predicted object positions. In some examples, the computing device(s) 302 may be associated with the vehicle computing device(s) 504 and/or the computing device(s) 534.

FIG. 4A further illustrates the vehicle 102 associated with a vehicle trajectory 402, a vehicle position 404, and a vehicle position 406. The vehicle trajectory 402 can represent a predicted trajectory from the vehicle computing device configured to control the vehicle 102. In various examples, the vehicle trajectory 402 can include a pose or heading, an acceleration, and/or a velocity associated with the vehicle 102. The vehicle position 404 and the vehicle position 406 can represent a predicted position of the vehicle 102 at a time in the future. In some examples, the prediction component 104 can receive the vehicle trajectory 402, the vehicle position 404, and/or the vehicle position 406 as input data.

In various examples, the computing device(s) 302 can receive map data representing an environment that includes an object 408 and an object 410 (e.g., additional vehicles). In various examples, the objects 408 and 410 may be detected based at least in part on sensor data from one or more sensors associated with the vehicle 102 (such as during previous navigation in the environment). Additionally, or alternatively, the computing device(s) 302 can receive historical data representing object positions in the environment at a previous time or time period. Such historical positions of all objects (which may include the vehicle) may be input into a machine learned model to determine a set of potential targets (e.g., future states-position, velocity, orientation, etc.) associated with an object. In various examples, the cluster component 304 can determine a first cluster 412, a second cluster 414, and/or a third cluster 416 (referred to collectively as "the clusters") of the set of potential targets of the vehicle. FIG. 4A shows the first cluster 412 comprising positions 418 (e.g., 418(1), 418(2), . . . 418(N), where N is an integer). The positions 418 of the first cluster 412 can represent a distribution of predicted (or candidate) object positions that cause a same or similar vehicle behavior, for example. For clarity and brevity, the positions are shown in relation to the first cluster 412, though each respective cluster can comprise multiple object positions.

In some examples, the cluster component 304 can associate, select, or otherwise determine object positions for including in a cluster based on one or more future positions of the vehicle 102 (e.g., the vehicle trajectory 402, the vehicle position 404, and/or the vehicle position 406). The clusters can, in various examples, include different numbers of object positions and can vary in size. As an example, the cluster component 304 can select at least some object positions from a distribution of object positions output by a model based on the object positions (e.g., the positions 418) causing the vehicle to take a first action (e.g., brake to avoid an object) if an object occupied the object position at a future time. In some examples, the object 408 can make a U-turn as indicated by a dashed line in FIG. 4A, and the vehicle 102 can plan for the possibility that the object 408 can arrive at a position within the first cluster 412. In other examples, the object 408 can go straight at the intersection to occupy a position in the second cluster 414 or the third cluster 416, or take a left turn to occupy the third cluster 416. As can be seen, the third cluster 416 comprises predictions of the object 408 continuing straight as well as making a left turn. These predictions are clustered since both require the vehicle 102 to yield to object 408 (e.g., by waiting and/or stopping at the intersection prior to proceeding).

In various examples, the output data 310 (e.g., a subset of the distribution of object positions) can include a position from multiple clusters (e.g., two or more of the first cluster 412, the second cluster 414, or the third cluster 416). For example, the analysis component 306 can select a most probable position of the available positions in each respective cluster. In various examples, the analysis component 306 can determine a probability of an object occupying a position, and compare the probabilities one to another to select a position.

In some examples, the analysis component 306 may also or instead determine a threshold number of object positions to include as the output data 310 based at least in part on one or more criteria. The criteria can include, for example, determining a minimum number of clusters for consideration to plan for different vehicle actions, a maximum number of clusters, a number of positions from different clusters, etc. The criteria may also or instead include vehicle state data, traffic control information (e.g., right-of-way, etc.), distance information (e.g., between objects and/or an object and the vehicle), temporal information (e.g., time for an object and/or the vehicle to reach a position), and so on. In some examples, the analysis component 306 may determine the threshold number of object positions to include as the output data 310 based on criteria representing one or more costs. A cost may be associated with a vehicle behavior (e.g., to ensure that a minimum number of vehicle behaviors are represented) and/or a cluster (e.g., a cost to omit or include a cluster), just to name a few.

By determining clusters and processing a subset of positions from the clusters, the output data 310 can represent multiple different actions that an object may take, whether the object is a pedestrian, another vehicle, or the like regardless of the probability. As such, the vehicle may consider all potential positions of the object in deciding how to navigate. Such consideration provides an improvement as, for example, positions which are associated with low probability clusters-though still possible—may be evaluated despite limited computational resources.

In some examples, the prediction component 104 can receive or generate a distribution of vehicle positions representing different possible positions of the vehicle 102 at a time in the future. The positions of the vehicle distribution can be compared to each other to determine a modified vehicle position (e.g., an average position, mean position, or other relationship among the vehicle positions). In some examples, the modified vehicle position can be used as the vehicle position 404. Additionally, or alternatively, the cluster component 304 can cluster the threshold number of candidate object positions relative to the modified candidate vehicle position to determine the first cluster 412, the second cluster 414, and so on.

In some examples, the analysis component 306 can determine a subset of object positions from the candidate object positions (whether clustered or part of an a distribution that does not include the clusters) based on determining a first probability of an object occupying a first object position 418(1) of the first cluster 412 and a second probability of the object occupying a second object position 418(2) of the first cluster 412. In some examples, the analysis component 306 can select the first (candidate) object position or the second (candidate) object position from the first cluster 412 as the subset of object positions based at least in part on the first probability and the second probability.

In various examples, the analysis component 306 can determine a first score for an object (e.g., the object 408 or the object 410) to occupy the first cluster 410 at a future time and a second score for the object to occupy the second cluster 412 at the future time, and so on for each determined cluster. In such examples, the analysis component 306 can determine the subset of object positions based at least in part on the first score and the second score. In some examples, the output data 310 can include a set of clusters having a variety of scores to capture low-likelihood actions by an object. In some examples, the score can represent a similarity between a candidate position(s) of an object in a cluster relative to a vehicle position (e.g., a distance from the vehicle position 404).

Though the vehicle positions are depicted in FIG. 4A adjacent to a cluster, in various examples, the vehicle position 404 and/or the vehicle position 406 can be included in a cluster (e.g., within bounds of the cluster).

In some examples, a score for a cluster can represent a relevance of the positions in the cluster to the vehicle, and can be based on a probability of an object occupying a respective position, a cost of including or excluding the cluster as output data, just to name a few, object state data for an object associated with the cluster, vehicle state data, right-of-way information associated with an object(s) in the cluster, etc. For example, the analysis component 306 can determine probabilities for various object positions, and further determine the score based on an average, a mean, and/or a maximum probability per cluster, or other computation. In some examples, the analysis component 306 can select object positions from one or more clusters as the output data 310 (e.g., based on scores, probabilities, or the like). By way of example and not limitation, object positions can be selected from a cluster to represent a reference action in a tree search.

In some examples, a score for a cluster can indicate whether or not to include a position from the cluster in a subset of object positions represented by the output data 310. For example, the analysis component 306 can compare scores one to another to determine whether to select one or more positions from a respective cluster. The analysis component 306 can, for example, determine whether to include a position from a cluster associated with a relatively low score (e.g., a score lower than the score of another cluster) to ensure that the output data 310 includes a position associated with less likely vehicle behaviors.

Figure 4B:
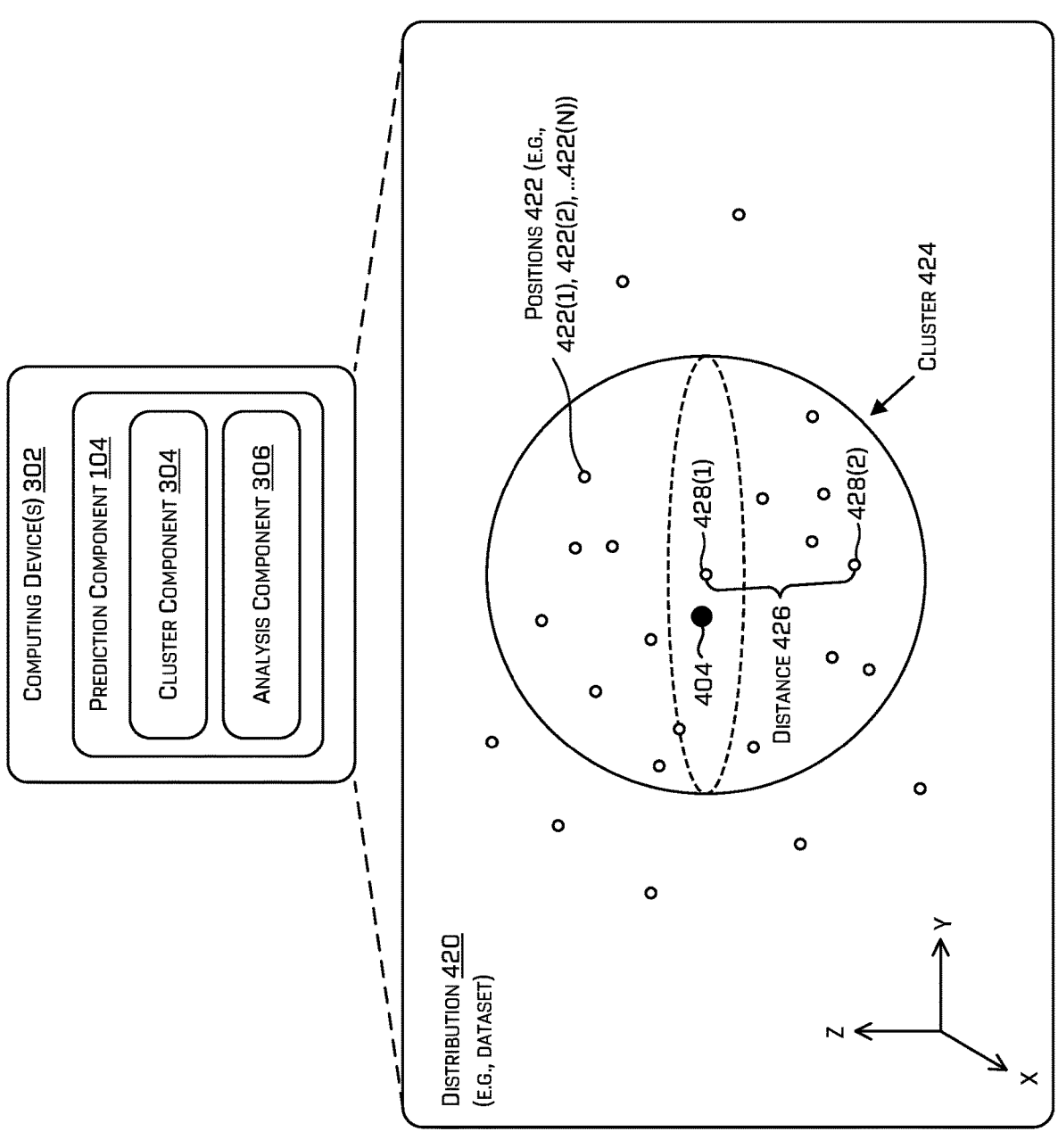
FIG. 4B illustrates an example block diagram of a computing device implementing an example cluster component to generate object position information.

FIG. 4B illustrates an example block diagram 400 of a computing device implementing an example cluster component to generate object position information. In various examples, the analysis component 306 can determine a dataset 420 comprising positions 422 comprising a position 422(1), 422(2), . . . , up to 422(N), where N is an integer. In some examples, the positions 422 can correspond to respective object positions shown visualized in three-dimensional space for easier interpretation, but it should be understood that parameter space used for clustering can contain any number of parameters and is not limited in size or dimension. In various examples, the analysis component 306 can generate the positions 422 to represent different candidate positions for an object in an environment, and compare the positions 422 one to another in a variety of ways to determine a difference and/or similarity. In various examples, a number of the positions in the dataset 420 can vary to make available a variety of different properties for comparing. For example, the cluster component 304 can perform clustering (e.g., implement a clustering algorithm) to cause the positions 422 to be associated with a cluster 424 which can include any number of positions. Though a single cluster is shown, any number of clusters may be identified or determined by the cluster component 304.

In various examples, the analysis component 306 can compare properties of positions of the cluster 424 one to another and/or to the vehicle position 404 to identify a most likely position for the object (e.g., an average, mean, or other calculation). By comparing the positions 422 to each other and/or to the vehicle position 404, a reduced dataset for processing that still represents the positions in the cluster 424).

In some examples, the analysis component 306 can determine a distance 426 between position 428(1) at a center of the cluster 424 and position 428(2) (and optionally other points within a boundary of the cluster 424). The distance 426 can represent similarity between first properties associated with the position 428(1) and second properties associated with the position 428(2) (e.g., a point closer to the position 428(1) may be more similar than a point further from the position 428(1)).

Although the cluster 424 is shown in the example as a sphere, other shapes and/or sizes are also possible depending on a number of parameters in the parameter space (e.g., the dataset 420). Generally, the cluster 424 can represent a subset of points identified as having a relationship based on a clustering technique (e.g., causing a same vehicle action).

Figure 5:
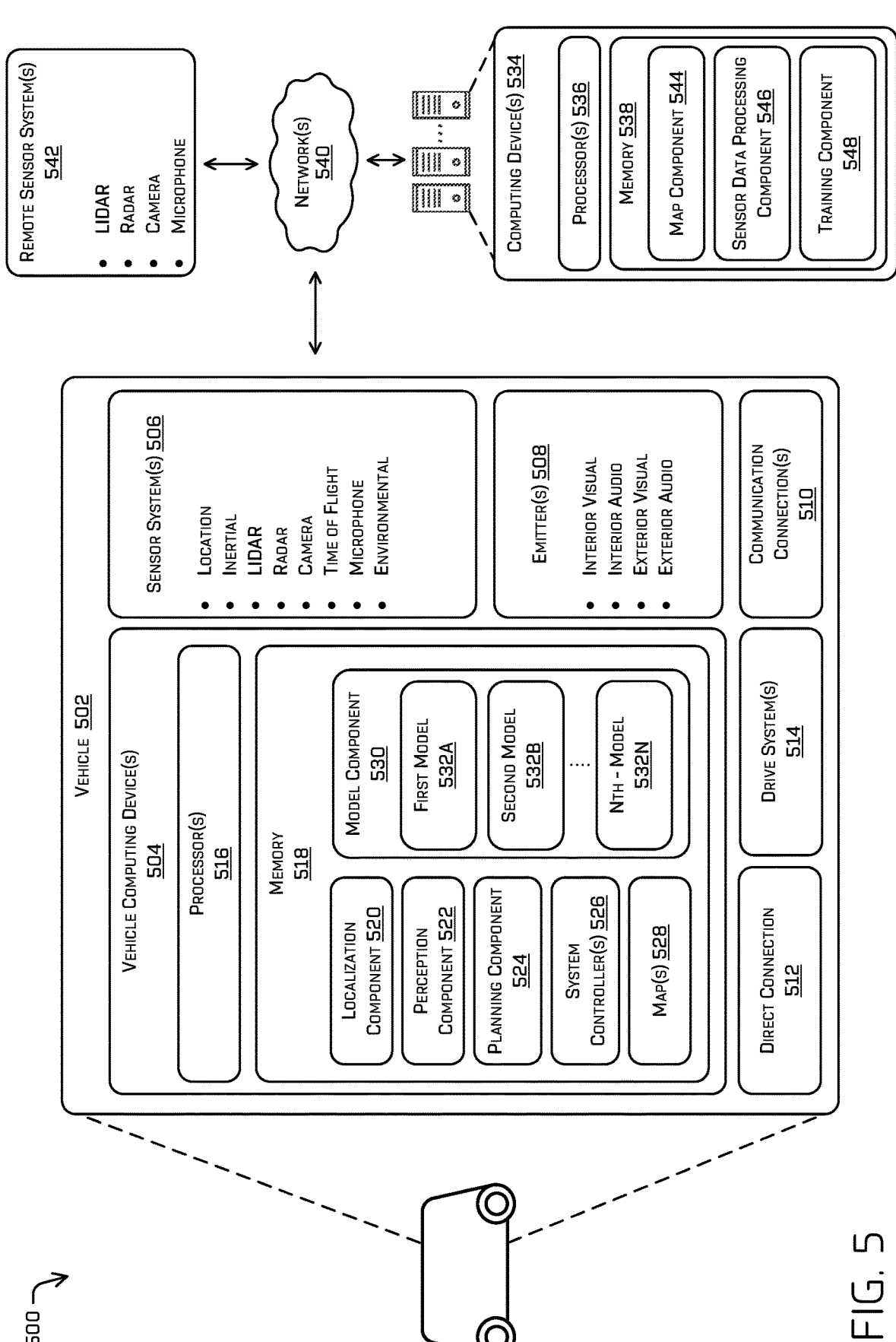
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

The vehicle 502 may include a vehicle computing device 504, one or more sensor systems 506, one or more emitters 508, one or more communication connections 510, at least one direct connection 512, and one or more drive system(s) 514.

The vehicle computing device 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In various examples, the vehicle computing device 504 may store sensor data associated with actual location of an object at the end of the set of estimated states (e.g., end of the period of time) and may use this data as training data to train one or more models. In some examples, the vehicle computing device 504 may provide the data to a remote computing device (i.e., computing device separate from vehicle computing device such as the computing device(s) 534) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference in its entirety and for all purposes.

In the illustrated example, the memory 518 of the vehicle computing device 504 stores a localization component 520, a perception component 522, a planning component 524, one or more system controllers 526, one or more maps 528, and a model component 530 including one or more model(s), such as a first model 532A, a second model 532B, up to an Nth model 532N (collectively "models 532"), where N is an integer. Though depicted in FIG. 5 as residing in the memory 518 for illustrative purposes, it is contemplated that the localization component 520, a perception component 522, a planning component 524, one or more system controllers 526, one or more maps 528, and/or the model component 530 including the model(s) 532 may additionally, or alternatively, be accessible to the vehicle 502 (e.g., stored on, or otherwise accessible by, memory remote from the vehicle 502, such as, for example, on memory 538 of a remote computing device 534). In some examples, the model(s) 532 can provide functionality associated with the prediction component 104. In some examples, the model(s) 532 can include one or more of: a machine learned model, a statistical model, a heuristic model, or a combination thereof.

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 544, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., objects) in an environment and/or to generate predicted candidate trajectories for the vehicle 502. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect objects in an environment, generate routes, determine actions and/or trajectories to navigate within an environment.

In some examples, the one or more maps 528 may be stored on a remote computing device(s) (such as the computing device(s) 534) accessible via network(s) 540. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computing device 504 may include a model component 530. The model component 530 may be configured to perform the functionality of the prediction component 104, including predicting object positions, vehicle positions, clustering object positions relative to a predicted vehicle position(s), etc. In various examples, the model component 530 may receive one or more features associated with the detected object(s) from the perception component 522 and/or from the sensor system(s) 506. In some examples, the model component 530 may receive environment characteristics (e.g., environmental factors, etc.) and/or weather characteristics (e.g., weather factors such as snow, rain, ice, etc.) from the perception component 522 and/or the sensor system(s) 506. While shown separately in FIG. 5, the model component 530 could be part of the planning component 524 or other component(s) of the vehicle 502.

In various examples, the model component 530 may send predictions from the one or more models 532 that may be used by the planning component 524 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 524 may determine one or more actions (e.g., reference actions and/or sub-actions) for the vehicle 502, such as vehicle candidate trajectories. In some examples, the model component 530 may be configured to determine whether an object occupies a future position based at least in part on the one or more actions for the vehicle 502. In some examples, the model component 530 may be configured to determine the actions that are applicable to the environment, such as based on environment characteristics, weather characteristics, another object, or the like.

The model component 530 may generate sets of estimated states of the vehicle and one or more detected objects forward in the environment over a time period. The model component 530 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the model component 530 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 530 may generate estimated states at 0.1 second intervals throughout the time period. For another example, the model component 530 may generate estimated states at 0.05 second intervals. The estimated states may be used by the planning component 524 in determining an action for the vehicle 502 to take in an environment.

In various examples, the model component 530 may utilize machine learned techniques to predict object positions, vehicle positions, and so on. In such examples, the machine learned algorithms may be trained to determine, based on sensor data and/or previous predictions by the model, that an object is likely to behave in a particular way relative to the vehicle 502 at a particular time during a set of estimated states (e.g., time period). In such examples, one or more of the vehicle 502 state (position, velocity, acceleration, trajectory, etc.) and/or the object state, classification, etc. may be input into such a machine learned model and, in turn, a trajectory prediction may be output by the model.

In various examples, characteristics associated with each object type may be used by the model component 530 to determine a position, a trajectory, a velocity, or an acceleration associated with the object. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 520, the perception component 522, the planning component 524, the one or more system controllers 526, the one or more maps 528, the model component 530 including the model(s) 532 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 502 and a secondary safety system that operates on the vehicle 502 to validate operation of the primary system and to control the vehicle 502 to avoid collisions.

In some instances, aspects of some or all of the components discussed herein may include any models, techniques, and/or machine learned techniques. For example, in some instances, the components in the memory 518 (and the memory 538, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 540, to the one or more computing device(s) 534 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 534, other nearby vehicles, etc.) and/or one or more remote sensor system(s) 542 for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 540. For example, the communications connection(s) 510 can enable Wi-Fi-based communication such as via frequencies defined by the IEEE 502.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the model component 530, may process sensor data, as described above, and may send their respective outputs, over the one or more network(s) 540, to the computing device(s) 534. In at least one example, the localization component 520, the perception component 522, the planning component 524, the one or more system controllers 526, the one or more maps 528, and the model component 530 may send their respective outputs to the remote computing device(s) 534 at a particular frequency, after a lapse of a predetermined period of time, in near real-time, etc.

In some examples, the vehicle 502 may send sensor data to the computing device(s) 534 via the network(s) 540. In some examples, the vehicle 502 may receive sensor data from the computing device(s) 534 and/or remote sensor system(s) 542 via the network(s) 540. The sensor data may include raw sensor data and/or processed sensor data and/or representations of sensor data. In some examples, the sensor data (raw or processed) may be sent and/or received as one or more log files.

The computing device(s) 534 may include processor(s) 536 and a memory 538 storing the map component 544, a sensor data processing component 546, and a training component 548. In some examples, the map component 544 may include functionality to generate maps of various resolutions. In such examples, the map component 544 may send one or more maps to the vehicle computing device 504 for navigational purposes. In various examples, the sensor data processing component 546 may be configured to receive data from one or more remote sensors, such as sensor system(s) 506 and/or remote sensor system(s) 542. In some examples, the sensor data processing component 546 may be configured to process the data and send processed sensor data to the vehicle computing device 504, such as for use by the model component 530 (e.g., the model(s) 532). In some examples, the sensor data processing component 546 may be configured to send raw sensor data to the vehicle computing device 504.

In some instances, the training component 548 (e.g., trained in accordance with the techniques discussed in FIGS. 4A and 4B) can include functionality to train a machine learning model to output probabilities for whether an occluded region is free of any objects or whether the occluded region is occupied by a static obstacle or a dynamic object. For example, the training component 548 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 548 may be executed by the processor(s) 536 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with occluded regions and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 548 can include functionality to train a machine learning model to output classification values. For example, the training component 548 can receive data that represents labelled collision data (e.g. publicly available data, sensor data, and/or a combination thereof). At least a portion of the data can be used as an input to train the machine learning model. Thus, by providing data where the vehicle traverses an environment, the training component 548 can be trained to output occluded value(s) associated with objects and/or occluded region(s), as discussed herein.

In some examples, the training component 548 can include training data that has been generated by a simulator. For example, simulated training data can represent examples where a vehicle collides with an object in an environment or nearly collides with an object in an environment, to provide additional training examples.

The processor(s) 516 of the vehicle 502 and the processor(s) 536 of the computing device(s) 534 may be any suitable processor capable of executing instructions to process data and perform operations as described herein. By way of example and not limitation, the processor(s) 516 and 536 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 538 are examples of non-transitory computer-readable media. The memory 518 and memory 538 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 534 and/or components of the computing device(s) 534 may be associated with the vehicle 502. That is, the vehicle 502 may perform one or more of the functions associated with the computing device(s) 534, and vice versa.

FIG. 6A is a first part of a flowchart depicting an example process 600 for determining object positions using one or more example models. Some or all of the process 600 may be performed by one or more components in FIG. 5, as described herein. For example, some or all of the process 600 can be performed by one or more components in FIG. 1, FIG. 3, and/or FIG. 5, as described herein. For example, some or all of the process 600 can be performed by the vehicle computing device(s) 504 or the computing device(s) 534.

At operation 602, the process may include receiving, by a first machine learned model, first data indicating historical locations associated with multiple objects in an environment. In some examples, the operation 602 may include a computing device implementing the prediction component 104 to receive log data associated with one or more autonomous vehicles. The log data can, for instance, identify previous positions of various objects of different object types over a previous time period. The prediction component 104 may also receive map data that includes features of a real-world environment and/or a simulated environment. In various examples, the log data and/or the map data can be associated with previous navigation by the autonomous vehicle(s) in the real-world environment and/or a previous simulation in the simulated environment. In various examples, data input into the prediction component 104 (e.g., the input data 308) can be received from a storage device or component of a vehicle computing device.

In some examples, the operation 602 can include receiving input data that includes the top-down representation 208 and/or a feature vector representing the environment and/or an object. For example, the prediction component 104 may receive, as part of the input data, the feature vector 226 from the machine learned model 224 and/or the feature vector 230 from the machine learned model 228. In some examples, the input data can represent historical data associated with one or more objects in the environment.

At operation 604, the process may include predicting, by the first machine learned model and based at least in part on the first data, a first set of candidate positions associated with an object. In some examples, the operation 604 may include the prediction component 104 implementing a machine learned model to determine a distribution of object candidate positions representing an area, point, or location in the environment that an object may occupy at a future time. The first set of candidate positions can, in some examples, include at least a portion of the object candidate positions in the distribution. In some examples, the prediction component 104 can select a subset of object candidate positions from the distribution as the first set of candidate positions.

At operation 606, the process may include receiving, by a second machine learned model, second data indicating locations associated with an autonomous vehicle in the environment. In some examples, the operation 606 may include the prediction component 104 implementing another machine learned model configured to identify a distribution of vehicle candidate positions representing an area, point, or location in the environment that the vehicle may occupy at the future time. For instance, the prediction component 104 can receive historical vehicle data, log data, etc. describing previous vehicle position(s) and/or predicted vehicle position(s) describing a future position of the vehicle. In various examples, the second machine learned model can also or instead receive map data and/or planner data (e.g., trajectory data, position data, etc. from a planning component such as the planning component 524). Though described as different machine learned models, in some examples, functionality associated with the first machine learned model and the second machine learned model can be incorporate into a single machine learned model.

At operation 608, the process may include predicting, by the second machine learned model and based at least in part on the second data, a second set of candidate positions associated with the autonomous vehicle. In some examples, the operation 608 may include the prediction component 104 determine a distribution or dataset of vehicle candidate positions representing an area, point, or location in the environment that the autonomous vehicle (e.g., the vehicle 102) may occupy at the future time. In various examples, the second set of candidate positions associated with the autonomous vehicle can include positions associated with the vehicle 102 or another vehicle (e.g., in a real-world environment or simulated environment).

FIG. 6B is a second part of the flowchart depicting an example process 600 for determining object positions using one or more example models.

At operation 610, the process may include clustering the first set of candidate positions associated with the object relative to the second set of candidate positions associated with the autonomous vehicle. In some examples, the operation 610 may include the cluster component 304 determining a cluster (e.g., the first cluster 410) for some of the candidate position in the first set of candidate positions associated with the object based on a candidate position in the second set of candidate positions associated with the autonomous vehicle. The candidate positions in the first cluster, if occupied by an object, cause a same vehicle behavior in the future. For example, the autonomous vehicle can brake (or take some other action) to avoid an object at a position in the cluster regardless of the type of object or where the object originated prior to occupying the position. In various examples, additional clusters associated with different autonomous vehicle behaviors can be determined to capture a variety of potential vehicle behaviors for different candidate object positions.

At operation 612, the process may include determining, based at least in part on the clustering, third data representing a subset of the first set of candidate positions associated with the object. Such a subset may be based on, for example, scoring as described in detail herein. In some examples, the operation 612 may include the prediction component 104 comparing positions within a cluster one to another and/or to a vehicle position, and selecting a candidate position in a respective cluster as the subset of the first set of candidate positions.

At operation 614, the process may include determining if a model is currently being trained, or whether the model has been trained previously. For instance, the operation 614 can include determining if a machine learned model(s) associated with the prediction component 104 is being trained. If the model is not being trained (e.g., "no" in the operation 614), the process can continue to operation 616 to transmit the third data to a vehicle computing device associated with the autonomous vehicle, the vehicle computing device configured to determine an action for the autonomous vehicle to avoid the object. If the model is being trained (e.g., "yes" in the operation 614), the process continues to operation 618 to update a parameter(s) of the model based at least in part on the output by the model. Of course, in some examples, operations can be performed in parallel, depending on an implementation.

At operation 616, the process may include transmitting the third data to a vehicle computing device associated with the autonomous vehicle, the vehicle computing device configured to determine an action for the autonomous vehicle to navigate in relation to the object. In various examples, the vehicle computing device is configured to determine a trajectory for the vehicle based at least in part on the output. For example, an output from the model component 530 can be sent to the perception component 522 or the planning component 524, just to name a few. In various examples, the vehicle computing device may control operation of the vehicle, such as the planning component 524. The vehicle computing device may determine a vehicle trajectory based at least in part on the subset of object positions (e.g., the third data) thereby improving vehicle safety by planning for the possibility that the object may behave unexpectedly at a point in time. Additional details of controlling a vehicle using one or more outputs from one or more modes are discussed throughout the disclosure.

In some examples, the operation 616 may include the planning component 524 utilizing the subset of object positions output by the prediction component 104 to determine a candidate trajectory or other action for the vehicle to avoid potential intersections between the object and the vehicle. In some examples, the operation 616 may include controlling, by the vehicle computing device(s) 504, the vehicle in an environment in the future based at least on the output data 310 from the prediction component 104. In some examples, the operation 616 may include causing the vehicle to be controlled in a real-world environment based at least in part on the transmitted data At operation 618, a training component (e.g., the training component 548) can update, alter, and/or augment one or more parameters of a machine learned model to train the model. In some instances, the output from the model component 530 can be compared against training data (e.g., ground truth representing labelled data) for use in training. Based at least in part on the comparison, the training component 548 can identify parameter(s) associated with the model component 530 for updating. In various examples, the output may be used to train models such as a convolutional neural network a and/or a graph neural network.

In various examples, process 600 may return to 602 after performing operation 616 and/or 618. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

FIGS. 6A and 6B illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. By way of example and not limitation, operations 602, 604, and 610 may be performed without operations 606 and 608 (e.g., a single vehicle position can be received instead). Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform actions comprising: receiving, by a first machine learned model, first data indicating historical locations associated with multiple objects in an environment; predicting, by the first machine learned model and based at least in part on the first data, a first set of candidate positions associated with an object; receiving, by a second machine learned model, the first data and second data indicating locations associated with an autonomous vehicle in the environment; predicting, by the second machine learned model and based at least in part on the first data and the second data, a second set of candidate positions associated with the autonomous vehicle; clustering the first set of candidate positions associated with the object based at least in part on the second set of candidate positions associated with the autonomous vehicle; determining, based at least in part on the clustering, third data representing a subset of the first set of candidate positions associated with the object; and transmitting the third data to a vehicle computing device associated with the autonomous vehicle, the vehicle computing device configured to determine an action for the autonomous vehicle to navigate in relation to the object.

B: The system of paragraph A, the actions further comprising: inputting fourth data comprising object state data or vehicle state data into the first machine learned model, wherein predicting the first set of candidate positions associated with the object is further based at least in part on the fourth data.

C: The system of either paragraph A or B, the actions further comprising: determining a first cluster of at least some of the first set of candidate positions associated with the object; and determining a second cluster of at least some of the first set of candidate positions associated with the object, wherein determining the third data comprises selecting a first candidate position from the first cluster and a second candidate position from the second cluster.

D: The system of paragraph C, the actions further comprising: generating a first reference action associated with a first candidate position in the first cluster and a second reference action associated with a second candidate position in the second cluster; and causing the vehicle computing device to determine the action for the autonomous vehicle to navigate the environment relative to the object based at least in part on the first reference action or the second reference action.

E: The system of any one of paragraphs A-D, wherein: the first data represents location information for the multiple objects over a time period, and the second data comprises at least one of: previous locations of the autonomous vehicle over a previous time period or predicted locations associated with a predicted trajectory of the autonomous vehicle.

F: A method comprising: determining candidate object positions for an object based at least in part on historical data associated with multiple objects in an environment, the multiple objects comprising the object; determining candidate vehicle positions for a vehicle to occupy at a future time; clustering a first portion of the candidate object positions into a first cluster and a second portion of the candidate object positions into a second cluster based at least in part on the candidate vehicle positions for the vehicle; determining, based at least in part on the clustering, a subset of object positions from the candidate object positions; and transmitting the subset of object positions to a vehicle computing device for determining an action for the vehicle to navigate in relation to an object.

G: The method of paragraph F, further comprising: receiving map data comprising a top-down representation of the environment; wherein determining the candidate object positions and the candidate vehicle positions is further based at least in part on the map data.

H: The method of either paragraph F or G, further comprising: receiving vehicle data indicating at least one of: previous locations of the vehicle over a previous time period or predicted locations associated with a predicted trajectory of the vehicle; and wherein determining the candidate vehicle positions for the vehicle to occupy at the future time is based at least in part on the vehicle data.

I: The method of any one of paragraphs F-H, wherein: the first cluster is associated with a first vehicle behavior and the second cluster is associated with a second vehicle behavior different from the first vehicle behavior.

J: The method of any one of paragraphs F-I, further comprising: generating a first reference action associated with a first candidate position in the first cluster and a second reference action associated with a second candidate position in the second cluster; and causing the vehicle computing device to determine the action for the vehicle based at least in part on the first reference action or the second reference action.

K: The method of paragraph J, further comprising: associating the first reference action and the second reference action with nodes of a tree search; and causing the vehicle computing device to determine the action for the vehicle is based at least in part on the tree search.

L: The method of any one of paragraphs F-K, wherein determining the subset of object positions from the candidate object positions comprises: determining a first probability of an object occupying a first candidate object position of the first cluster and a second probability of the object occupying a second candidate object position of the first cluster; and determining the first candidate object position or the second candidate object position from the first cluster based at least in part on the first probability and the second probability, wherein the subset of object positions comprises at least one of: the first candidate object position or the second candidate object position from the first cluster.

M: The method of any one of paragraphs F-L, wherein determining the subset of object positions from the candidate object positions comprises: determining a cost associated with excluding the first cluster; and determining, based at least in part on the cost, a candidate object position from the first cluster to include the subset of object positions.

N: The method of any one of paragraphs F-M, further comprising: determining a threshold number of object positions to include as the subset of object positions based at least in part on one or more criteria.

O: The method of any one of paragraphs F-N, wherein: determining a first score associated with the first cluster and a second score associated with the second cluster; and determining the subset of object positions from the candidate object positions is based at least in part on the first score and the second score.

P: The method of any one of paragraphs F-O, wherein the clustering is performed by a machine learned model trained to cluster the candidate object positions based at least in part on one of: a vehicle action or a vehicle position.

Q: One or more non-transitory computer-readable media storing instructions that, when executed, cause one or more processors to perform actions comprising: determining candidate object positions for an object based at least in part on historical data associated with multiple objects in an environment, the multiple objects comprising the object; determining candidate vehicle positions for a vehicle to occupy at a future time; clustering a first portion of the candidate object positions into a first cluster and a second portion of the candidate object positions into a second cluster based at least in part on the candidate vehicle positions for the vehicle; determining, based at least in part on the clustering, a subset of object positions from the candidate object positions; and transmitting the subset of object positions to a vehicle computing device for determining an action for the vehicle to navigate in relation to an object.

R: The one or more non-transitory computer-readable media of paragraph Q, the actions further comprising: receiving map data comprising a top-down representation of the environment; and wherein determining the candidate object positions and the candidate vehicle positions is further based at least in part on the map data.

S: The one or more non-transitory computer-readable media of either paragraph Q or R, the actions further comprising: receiving vehicle data indicating at least one of: previous locations of the vehicle over a previous time period or predicted locations associated with a predicted trajectory of the vehicle, wherein determining the candidate vehicle positions for the vehicle to occupy at the future time is based at least in part on the vehicle data.

T: The one or more non-transitory computer-readable media of any one of paragraphs Q-S, wherein: the first cluster is associated with a first vehicle behavior and the second cluster is associated with a second vehicle behavior different from the first vehicle behavior.

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform actions comprising:
   receiving, by a first machine learned model, first data indicating historical locations associated with multiple objects in an environment;
   predicting, by the first machine learned model and based at least in part on the first data, a first set of candidate positions associated with an object;
   receiving, by a second machine learned model, second data indicating locations associated with an autonomous vehicle in the environment, the second data different from the first data;
   predicting, by the second machine learned model and a combination of the first data and the second data, a second set of candidate positions associated with the autonomous vehicle;
   clustering the first set of candidate positions associated with the object relative to the second set of candidate positions associated with the autonomous vehicle;
   determining, based at least in part on the clustering, third data representing a subset of the first set of candidate positions associated with the object; and
   transmitting the third data to a vehicle computing device associated with the autonomous vehicle, the vehicle computing device configured to determine an action for the autonomous vehicle to navigate in relation to the object.

2. The system of claim 1, the actions further comprising:
   inputting fourth data comprising object state data or vehicle state data into the first machine learned model, wherein predicting the first set of candidate positions associated with the object is further based at least in part on the fourth data.

3. The system of claim 1, the actions further comprising:
determining a first cluster of at least some of the first set of candidate positions associated with the object; and
determining a second cluster of at least some of the first set of candidate positions associated with the object, wherein determining the third data comprises selecting a first candidate position from the first cluster and a second candidate position from the second cluster.

4. The system of claim 3, the actions further comprising:
generating a first reference action associated with the first candidate position in the first cluster and a second reference action associated with the second candidate position in the second cluster; and
causing the vehicle computing device to determine the action for the autonomous vehicle to navigate the environment relative to the object based at least in part on the first reference action or the second reference action.

5. The system of claim 1, wherein:
the first data represents location information for the multiple objects over a time period, and
the second data comprises at least one of: previous locations of the autonomous vehicle over a previous time period or predicted locations associated with a predicted trajectory of the autonomous vehicle.

6. A method comprising:
determining candidate object positions for an object based at least in part on historical data associated with multiple objects in an environment, the multiple objects comprising the object;
determining a first candidate vehicle position and a second candidate vehicle position for a vehicle to occupy at a future time;
clustering, into a first cluster, a first portion of the candidate object positions relative to the first candidate vehicle position for the vehicle;
clustering, into a second cluster a second portion of the candidate object positions relative to the second candidate vehicle position for the vehicle;
determining a subset of object positions from one or more of: the first portion of the candidate object positions of the first cluster or the second portion of the candidate object positions of the second cluster; and
transmitting the subset of object positions to a vehicle computing device for determining an action for the vehicle to navigate in relation to the object.

7. The method of claim 6, further comprising:
receiving map data comprising a top-down representation of the environment;
wherein determining the candidate object positions, the first candidate vehicle position, and the second candidate vehicle position is further based at least in part on the map data.

8. The method of claim 6, further comprising:
receiving vehicle data indicating at least one of: previous locations of the vehicle over a previous time period or predicted locations associated with a predicted trajectory of the vehicle;
wherein determining the first candidate vehicle position and the second candidate vehicle position for the vehicle to occupy at the future time is based at least in part on the vehicle data.

9. The method of claim 6, wherein:
the first cluster is associated with a first vehicle behavior and the second cluster is associated with a second vehicle behavior different from the first vehicle behavior.

10. The method of claim 6, further comprising:
generating a first reference action associated with a first candidate position in the first cluster and a second reference action associated with a second candidate position in the second cluster; and
causing the vehicle computing device to determine the action for the vehicle based at least in part on the first reference action or the second reference action.

11. The method of claim 10, further comprising:
associating the first reference action and the second reference action with nodes of a tree search; and
causing the vehicle computing device to determine the action for the vehicle is based at least in part on the tree search.

12. The method of claim 6, wherein determining the subset of object positions from the candidate object positions comprises:
determining a first probability of the object occupying a first candidate object position of the first cluster and a second probability of the object occupying a second candidate object position of the first cluster; and
determining the first candidate object position or the second candidate object position from the first cluster based at least in part on the first probability and the second probability,
wherein the subset of object positions comprises at least one of: the first candidate object position or the second candidate object position from the first cluster.

13. The method of claim 6, wherein determining the subset of object positions from the candidate object positions comprises:
determining a cost associated with excluding the first cluster; and
determining, based at least in part on the cost, a candidate object position from the first cluster to include the subset of object positions.

14. The method of claim 6, further comprising:
determining a threshold number of object positions to include as the subset of object positions based at least in part on one or more criteria.

15. The method of claim 6, wherein:
determining a first score associated with the first cluster and a second score associated with the second cluster; and
determining the subset of object positions from the candidate object positions is based at least in part on the first score and the second score.

16. The method of claim 6, wherein the clustering is performed by a machine learned model trained to cluster the candidate object positions based at least in part on one of: a vehicle action or a vehicle position.

17. One or more non-transitory computer-readable media storing instructions that, when executed, cause one or more processors to perform actions comprising:
determining candidate object positions for an object based at least in part on historical data associated with multiple objects in an environment, the multiple objects comprising the object;
determining a first candidate vehicle position and a second candidate vehicle position for a vehicle to occupy at a future time;

clustering, into a first cluster, a first portion of the candidate object positions relative to the first candidate vehicle position for the vehicle;

clustering, into a second cluster, a second portion of the candidate object positions relative to the second candidate vehicle position for the vehicle;

determining a subset of object positions from one or more of: the first portion of the candidate object positions of the first cluster or the second portion of the candidate object positions of the second cluster; and transmitting the subset of object positions to a vehicle computing device for determining an action for the vehicle to navigate in relation to the object.

18. The one or more non-transitory computer-readable media of claim 17, the actions further comprising:

receiving map data comprising a top-down representation of the environment;

wherein determining the candidate object positions, the first candidate vehicle position, and the second candidate vehicle position is further based at least in part on the map data.

19. The one or more non-transitory computer-readable media of claim 17, the actions further comprising:

receiving vehicle data indicating at least one of: previous locations of the vehicle over a previous time period or predicted locations associated with a predicted trajectory of the vehicle, wherein determining the first candidate vehicle position and the second candidate vehicle position for the vehicle to occupy at the future time is based at least in part on the vehicle data.

20. The one or more non-transitory computer-readable media of claim 17, wherein:

the first cluster is associated with a first vehicle behavior and the second cluster is associated with a second vehicle behavior different from the first vehicle behavior.

\* \* \* \* \*